(12) United States Patent
Semetey et al.

(10) Patent No.: US 10,465,055 B2
(45) Date of Patent: Nov. 5, 2019

(54) METHOD FOR TREATING SURFACES CONTAINING SI—H GROUPS

(75) Inventors: Vincent Semetey, Le Mans (FR); Nasreddine Kebir, Le Mans (FR)

(73) Assignees: CENTRE NATIONALE DE RECHERCHE SCIENTIFIQUE, Paris (FR); INSTITUT CURIE, Paris (FR)

( * ) Notice: Subject to any disclaimer, the term of this patent is extended or adjusted under 35 U.S.C. 154(b) by 1418 days.

(21) Appl. No.: 12/441,936

(22) PCT Filed: Oct. 3, 2007

(86) PCT No.: PCT/IB2007/054018
§ 371 (c)(1),
(2), (4) Date: Jul. 10, 2009

(87) PCT Pub. No.: WO2008/041187
PCT Pub. Date: Apr. 10, 2008

(65) Prior Publication Data
US 2009/0280337 A1    Nov. 12, 2009

(30) Foreign Application Priority Data
Oct. 3, 2006 (EP) .................................... 06020780

(51) Int. Cl.
*B05D 3/00* (2006.01)
*C08J 7/04* (2006.01)
*C08J 7/12* (2006.01)

(52) U.S. Cl.
CPC ............... *C08J 7/047* (2013.01); *C08J 7/12* (2013.01); *Y10T 428/31663* (2015.04)

(58) Field of Classification Search
CPC ........ C08J 7/047; C08J 7/12; Y10T 428/31663

USPC ..... 427/384, 385.5, 300; 428/451, 440, 420, 428/410
See application file for complete search history.

(56) References Cited

U.S. PATENT DOCUMENTS 4,094,832 A * 6/1978 Soderberg ................ 526/238.22
4,504,641 A * 3/1985 Nochumson ............... 526/238.2
(Continued)

FOREIGN PATENT DOCUMENTS

CN       1583834 A      5/2004
EP     1 006 140 A2     6/2000
(Continued)

OTHER PUBLICATIONS

Martwiset et al.; "Nonfouling Characteristics of Dextran-Containing Surfaces;" *Langmuir*; 2006; pp. 8192-8196; vol. 22.
(Continued)

*Primary Examiner* — Michael B Nelson
(74) *Attorney, Agent, or Firm* — Oliff PLC

(57) ABSTRACT

The present invention relates to method for treating a substrate or a surface thereof bearing Si—H groups to confer to it a physical and/or biochemical surface-modified property, wherein it comprises at least a step consisting of exposing, within a liquid medium, said substrate or a surface thereof with at least a polymer, said polymer containing: at least three reactive sites able to attach to said substrate or said surface by reacting with Si—H groups and further creating covalent bonds, and at least a molecule or a part thereof able to confer said modified property to said substrate or said surface thereof, said step being carried out in efficient conditions to promote the covalent grafting of said polymer to said substrate or surface thereof and the molecular weight of said polymer being greater than 1000 g/mol.

22 Claims, 2 Drawing Sheets

(56) References Cited

U.S. PATENT DOCUMENTS

| | | | |
|---|---|---|---|
| 4,540,753 | A | 9/1985 | Cozewith et al. |
| 4,696,986 | A | 9/1987 | Halasa et al. |
| 5,648,442 | A * | 7/1997 | Bowers ................. C07F 9/091 427/372.2 |
| 6,372,874 | B1 | 4/2002 | Cameron |
| 2002/0098364 | A1 | 7/2002 | Bernard et al. |
| 2002/0160139 | A1 * | 10/2002 | Huang et al. ............. 428/36.9 |
| 2005/0272046 | A1 * | 12/2005 | Schermer ............ G01N 21/253 435/6.11 |
| 2006/0041079 | A1 | 2/2006 | Lin et al. |
| 2012/0091443 | A1 | 4/2012 | Okabe et al. |

FOREIGN PATENT DOCUMENTS

| | | | |
|---|---|---|---|
| EP | 1 707 601 | A1 | 10/2006 |
| WO | WO 2004/009675 | A1 | 1/2004 |
| WO | WO 2005/111116 | A1 | 11/2005 |
| WO | WO 2006/005358 | * | 1/2006 |

OTHER PUBLICATIONS

Ma et al.; "Protein-Resistant Polymer Coatings on Silicon Oxide by Surface-Initiated Atom Transfer Radical Polymerization;" *Langmuir*; 2006; pp. 3751-3756; vol. 22.

Chen et al.; "Generic Bioaffinity Silicone Surfaces;"*Bioconjugate Chem.*; 2006; pp. 21-28; vol. 17.

Chen et al.; "Protein repellant silicone surfaces by covalent immobilization of poly(ethylene oxide);" *Biomaterials*; 2005 pp. 2391-2399; vol. 26.

Chen et al.; "Immobilization of heparin on a silicone surface through a heterobifunctional PEG spacer;" *Biomaterials*; 2005 pp. 7418-7424; vol. 26.

Buriak; "Organometallic Chemistry on Silicon and Germanium Surfaces;" *Chemical Reviews*; May 2002; pp. 1272-1308; vol. 102, No. 5.

Ginn and Steinbock, Polymer Surface Modification Using Microwave-Oven-Generated Plasma, Langmuir, vol. 19, No. 19, pp. 8117-8118 (2003).

Delamarche et al., Microcontact Printing Using Poly(dimethylsiloxane) Stamps Hydrophilized by Poly(ethylene oxide) Silanes, Langmuir, vol. 19, No. 21, pp. 8749-8758 (2003).

"Molar mass distribution;" Wikipedia; Nov. 3, 2011; p. 1-4.

Aug. 31, 2016 Office Action issued in Euorpean Patent Application No. 07 826 635.0.

Halasa et al., "Polybutadiene," Kirk-Othmer Encylcopedia of Chemical Technology, 2000, pp. 1-13.

* cited by examiner

METHOD FOR TREATING SURFACES CONTAINING SI—H GROUPS

The present invention relates to a method to functionalize surfaces bearing Si—H groups with a polymer.

Silicone polymers have many attributes that make them excellent materials for biomedical and drug delivery applications. For example, silicone polymers have been used as ophthalmic and blood-contacting biomaterial. However, their use in these applications and their future evolution as biomaterials is somewhat constrained by their extremely high surface hydrophobicity, which results in the adsorption of significant quantities of proteins from the surrounding biological environment causing thrombosis and adhesion of pathogens like bacteria.

Moreover, surface modification of polyorganosiloxanes to give well defined surfaces with controlled surface properties (wetability, electric conductivity . . . ) have gained a considerable interest in surface chemistry and microtechnology like microfluidic. However silicones do not normally possess appropriate properties to be used without any prior treatment.

It is well established that silicone polymers may be modified to confer to them various properties such as a hydrophilic character to make them compatible with the previous cited uses, such as lenses. For example, said silicone polymers may be treated in bulk by impregnation or soaking to get said hydrophilic character. It is however widely recognized that it is much more desirable that such property displays mainly on its surface.

Therefore, several approaches have been developed to introduce organic functionalities on silicone surfaces, including the use of UV/ozone procedure to create radicals and oxidation using plasma/$O_2$ to give alcohols and oxidized species. Alternative methods exploit plasma polymerization of various molecules to generate a functional surface for subsequent modification. However, these methods require several synthetic steps, are not always reproducible, often result in incomplete surface coverage and cannot be implemented in industry.

Moreover, technologies implying grafting of molecules by covalent bonds via one or more spacers to the silicone polymers surfaces have been developed but said process is most of the time not easy to implement in particular as far as at least two steps are required, the first one for grafting the spacer to the substrate and the second one for grafting the bioactive molecule to the terminal function of said spacer.

It is at last known from H. Chen et al., "Generic Bioaffinity Silicone Surfaces", *Bioconjugates Chem.* 2006, 17, 21-28 to produce modified surfaces of silicone in order to improve biocompatibility. Said silicone surfaces were functionalized during a one step simple procedure via hydrosilylation reaction between small molecules bearing one alkene group and Si—H bond reaction from the surface.

It is also known from H. Chen et al., "Immobilization of heparin on a silicone surface through a heterobifunctional PEG Spacer" *Biomaterials* 26 (2005) 7418-7424 to immobilize heparin on a silicone surface through a heterobifunctional polyethyleneglycol spacer.

H. Chen et al. "Protein repellant silicone surfaces by covalent immobilization of poly(ethylene oxide)", *Biomaterials* 26 (2005) 2391-2399 reports a method of linking poly(ethylene oxide) (PEO) by platinum-catalyzed hydrosilylation following the introduction of Si—H groups on the surfaces by acid-catalyzed equilibration in the presence of polymethylhydroxysiloxane.

Patent application WO 2005/111116, designing the same inventors as the authors of the previous cited articles, reports a general method to modify silicone materials so that they are biocompatible.

However, these methods present drawbacks that are major roadblocks against the industrialization of the process. They indeed require elaborate chemistry involving for example inert gas and/or organic solvents. Moreover these methods require the systematical pretreatment of the silicone surface to functionalize it with Si—H groups and also require the use of a catalyst. At last, these methods often result in incomplete surface coverage with the functional molecule of interest and the resulting coating is also often non long-lasting.

It follows that there still exists a need for a simple, inexpensive and widely accessible method conferring desired modified properties on silicone polymers surfaces in a high density.

It is moreover desirable to have at one's disposal a generic method able to confer to silicone polymers surfaces a wide range of modified properties which can for example be chosen among: hydrophilic character; improved hydrophobic character, cytotoxic properties such as antibiotic, bactericidal, viricidal and/or fungicidal properties; cell-adhesion property; improved biocompatibility such as protein repellency or adhesion property; electric conductivity property and reactivity property which renders said surface able to immobilize biomolecules.

Moreover, there exists a need to find new methods able to be performed under simple conditions, and for example in non organic solvents, such as water.

The same need of modifying surfaces exists in a comparable way for silicon substrates. Said silicon substrates are namely widely used in the microelectronic field and in the manufacture of biosensors and new methods to modify the original property of the silicon substrate surfaces are continuously developed. It is also well known to use the reactivity of Si—H groups on hydrogen-terminated silicon substrates to graft a broad range of molecules on it, for example organic molecules, in particular by reacting said substrate with unsaturated bonds or diazo groups, i.e. by hydrosilylation (For a review see Buriak J M., "Organometallic chemistry on silicon and germanium surfaces", *Chemical Reviews,* 2002, 102.

Moreover, some attempts have been reported to graft polymers on silicon surfaces, for example in S. Martwiset et al. *Langmuir,* 2006, 22, 8192-6 or Ma H et al. *Langmuir,* 2006, 22, 3751-6. However, the grafting techniques do not use hydrosilylation as far as the starting silicon surfaces are silicon oxides.

The present invention relates to a method for treating a substrate or a surface thereof bearing Si—H groups to confer to it a physical and/or biochemical surface-modified property, wherein it comprises at least a step consisting of exposing, within a liquid medium, said substrate or a surface thereof with at least a polymer, said polymer containing:

at least three reactive sites able to attach to said substrate or said surface by reacting with Si—H groups and further creating covalent bonds, and at least a molecule or a part thereof able to confer said modified property to said substrate or said surface thereof, said step being carried out in efficient conditions to promote the covalent grafting of said polymer to said substrate or surface thereof and the molecular weight of said polymer being greater than 1 000 g/mol.

The present invention is in particular targeted at a method for a substrate or a surface thereof bearing Si—H groups to confer to it a physical and/or biochemical surface-modified property, wherein it comprises at least a step consisting of exposing, within a liquid medium, said substrate or a surface thereof with at least a copolymer, said copolymer containing at least a monomer unit of type A including at least a reactive site able to attach to said substrate or said surface by covalent bonds and at least a monomer unit of type B including at least a molecule able to confer said modified property to said substrate or said surface thereof, said step being carried out in efficient conditions to promote the covalent grafting of said copolymer to said substrate or surface thereof and the molecular weight of said copolymer being greater than 1 000 g/mol.

Also included within the scope of the present invention is a polymer containing:
 at least three reactive sites able to attach to a substrate or said surface bearing Si—H groups by reacting with said Si—H groups and further creating covalent bonds, and
 at least a molecule or a part thereof able to confer a physical and/or biochemical modified property to said substrate or said surface thereof,
the molecular weight of said polymer being greater than 1 000 g/mol.

Said polymer may advantageously be a copolymer. Therefore according to another aspect, the invention also encompasses a copolymer containing at least a monomer unit of type A including at least a reactive site able to attach to a substrate or said surface bearing Si—H groups by reacting with said Si—H groups and further creating covalent bonds and at least a monomer unit of type B including at least a molecule or a part thereof able to confer a physical and/or biochemical modified property to said substrate or said surface thereof,
the molecular weight of said copolymer being greater than 1 000 g/mol.

According to another aspect, the invention furthermore concerns a composition for treating a substrate or a surface thereof bearing Si—H groups wherein it comprises, in a liquid medium, a polymer or a copolymer according to the present invention.

The invention also relates to a substrate bearing Si—H groups that has been provided on its surface with a modified physical and/or biochemical property, obtainable by a method according to the present invention.

According to a further aspect, the invention relates to the use of said substrate in various fields as listed hereinafter and to a preparation process of a copolymer according to the invention, wherein a starting homopolymer comprising at least two reactive sites is reacted at least with:
 a reagent that by reacting with at least one reactive site gives rise to a copolymer containing a reactive site able to attach to a substrate or a surface thereof bearing Si—H groups by reacting with said Si—H groups and further creating covalent bonds and/or
 with another reagent that by reacting with at least one reactive site gives rise to a copolymer able to confer a modified physical and/or biochemical property to said substrate or a surface thereof.

Unexpectedly, the inventors have found that a polymer and a copolymer inclusive, according to the invention, allow a simple procedure for the treatment of any substrate bearing Si—H groups on its surface. Moreover, it is adapted to be solubilized in a ready-to-use solution.

Moreover the inventors have found that the polymer and the copolymer inclusive, according to the invention, can be deposited on a large variety of substrates bearing Si—H groups, and more particularly provided that said substrate contains a sufficient amount of Si—H groups on its surface. Among said substrates bearing Si—H groups silicone and hydrogen-terminated silicon substrates may be cited.

The term "monomer" as used herein refers to a molecule or compound that usually contains carbon as its major component, is of relatively low molecular weight, and has a simple structure that is capable of assembling in polymeric chains by combination with itself or other similar molecules or compounds.

The term "monomer unit" as used herein refers to a constitutional unit of a polymer, which is formed starting from a unique monomer.

The term "copolymer" as used herein is defined as a polymer that is made up of more than one type of monomer.

The expression "statistical copolymer" or "random copolymer" as used herein interchangeably is defined as a copolymer that is made up of more that one monomer, and in which the different monomer units are randomly distributed in the polymeric chain.

The expression "linear copolymer" as used herein is defined as a copolymer that is not branched.

The expression "block copolymer" as used herein is defined as a copolymer in which monomers of one type are adjacent to each other and form homopolymer segments, and the different homopolymer segments are linked together.

The term "hydrogen-terminated silicon substrate" means a silicon substrate bearing Si—H groups on its surface.

The term "modified physical and/or biochemical property" refers to any physical and/or biochemical property which is different from the original property of the surface to be treated. A surface which has been treated and which exhibits a "modified physical and/or biochemical property" extends to a surface bearing reactive groups able to react with any reactive group on any biomolecule so biomolecules become covalently attached to the surface via the polymer.

The term "biocompatible" as used herein refers to the capacity to be usable in biological environment in particular animal subjects, including humans. Biocompatibility may be achieved via various properties which are depending from the context of the application. For example, a material may be rendered biocompatible or may exhibit improved biocompatibility by improved protein repellency, by improved adhesion property or by introduction of any biological property which render the material compatible with its use in said biological environment, such as antithrombotic property.

The term "biomolecule" as used herein encompasses any molecule known to be found in biological systems and includes amino acids, peptides, proteins, nucleic acids (including DNA and RNA), saccharides, polysaccharides, growth factors and glycoproteins. Biomolecule includes a biomolecule naturally occurring as well as a biomolecule which has been modified using techniques known from the man skilled in the art.

The term "efficient conditions to" means the usual conditions to perform a chemical reaction defined by the usual parameters, i.e. pH, temperature, solvent, duration, etc., which fall within the standard skills of a man of the art.

The term "sufficient amount of Si—H groups" means a sufficient amount of Si—H groups allowing, when carrying out the method of the present invention on a given substrate, to measure by known methods that the surface has been significantly modified regarding a given predetermined property or character.

The term "a reactive site able to attach" means a chemical function suitable to create covalent bonds with the Si—H groups.

The term "able to confer said modified property" refers to the ability to confer said given property which can be measured at the macroscopic and/or microscopic scale by known methods.

For simplification reasons, in the framework of the invention, the term "cytotoxic", which is employed to qualify the modified properties of the substrate should be deemed to include not only the bactericidal or antibiotic properties, but also viricidal, fungicidal or in general any bioactive substance that is cytotoxic to any living cell the elimination of which is desired. Moreover, the term "anti-adhesive properties" encompasses the properties imparting repellency to proteins, bacteria, viruses, cells etc . . . .

FIG. 1 represents the general procedure for the functionalization of a silicone substrate with a statistical copolymer bearing positive charges and therefore conferring bactericidal properties.

FIG. 2 represents a particular procedure for the functionalization of a silicone substrate with the statistical copolymer as synthesized in example 1.

SUBSTRATE BEARING SI—H GROUPS

Figure 1:
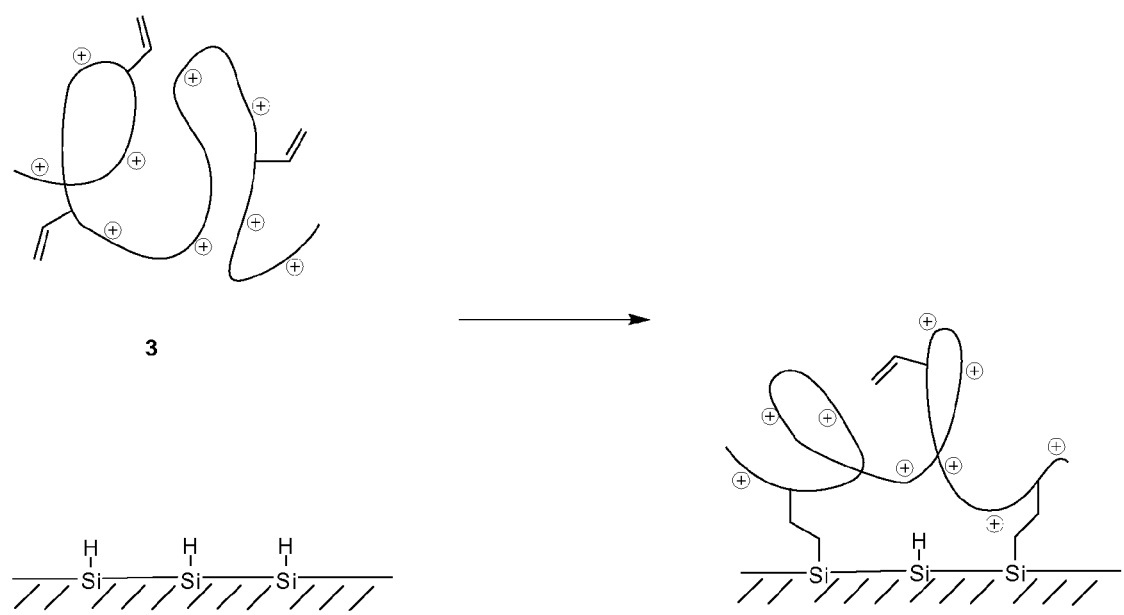
FIGS. 1 and 2 illustrate the present invention.
Figure 2:
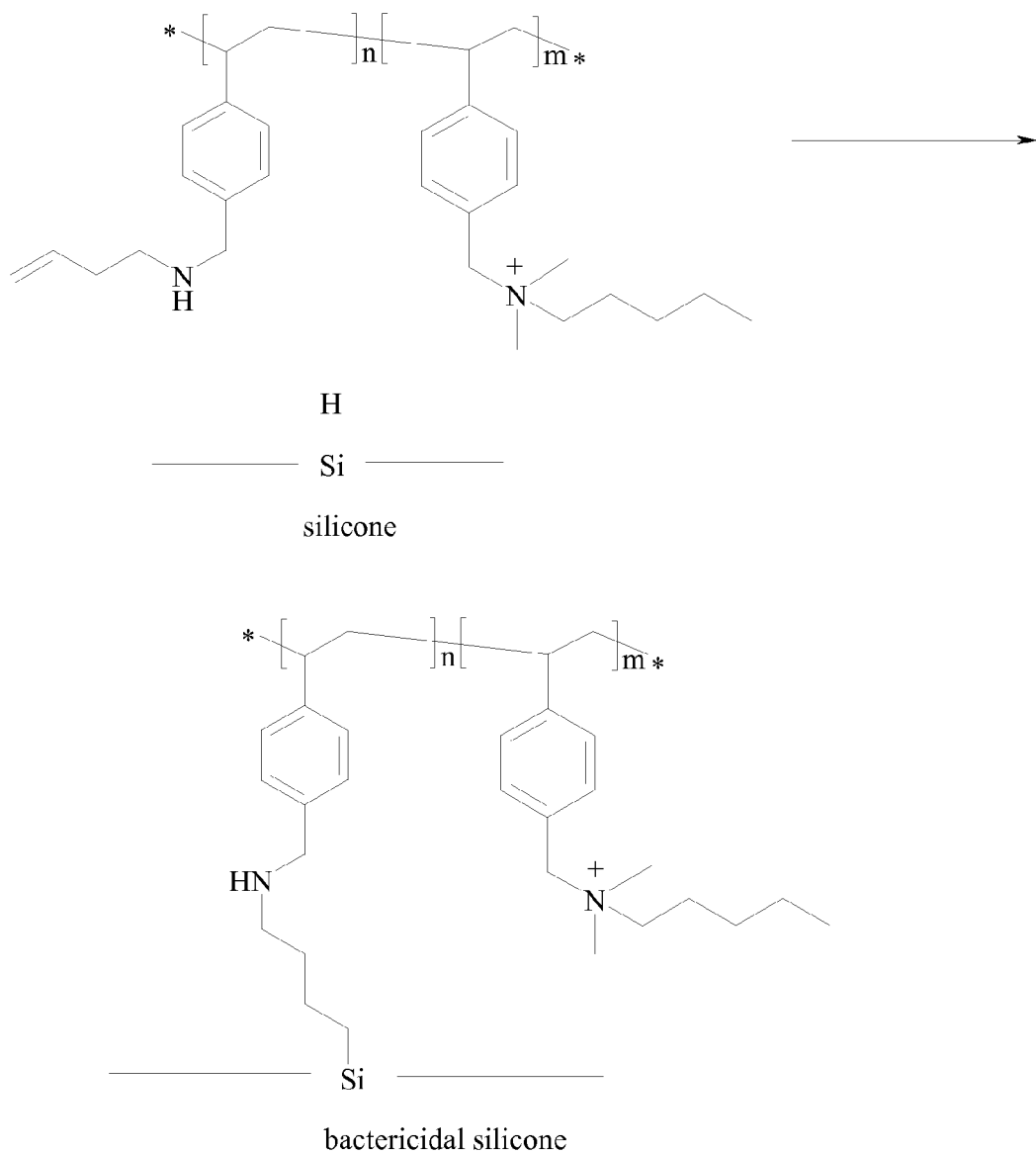

The main representing classes of substrates bearing Si—H groups are silicone substrates and hydrogen-terminated silicon substrates.

Silicone Substrates

In the framework of the present invention all types of silicones technically known as polyorganosiloxanes or polysiloxane substrates may be treated by the method according to the present invention provided that said silicone substrate contains a sufficient amount of Si—H groups on its surface.

In fact, due to the manufacture process of silicones, they always naturally bear Si—H groups on their surface, remaining from said process. As will be exposed herein after, due to the present method using polymers showing a molecular mass greater than 1 000 g/mol, the surface to be treated do not need to bear a great amount of Si—H groups, in contrast to the method known in the art to modify the surfaces of a silicone substrate.

Silicones defines the broad class of synthetic polymers containing a —Si—O-backbone to which organic side groups are frequently attached via a Si—C bond. In other words, the chemical formula of silicones reads

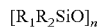

where $R_1$ and $R_2$ are each, independent of one another, selected from H, $(C_1$-$C_{30})$alkyl, $(C_2$-$C_{30})$alkynyl and aryl, with the latter four groups being unsubstituted or substituted with one or more groups for example independently selected from an halogen atom, —OH, —NH$_2$, —NH($C_1$-$C_{30}$)alkyl, —N($C_1$-$C_6$)alkyl($C_1$-$C_6$)alkyl, —O($C_1$-$C_6$)alkyl and halo-substituted $(C_{1-6})$alkyl groups.

The term silicone also encompasses the polymers where said organic side groups are used to link two or more of the —Si—O— backbones together.

By varying the —Si—O— chain lengths, organic side groups and cross-linking silicones can be synthesized with a wide variety of properties and compositions.

The silicones which are more particularly aimed at in the present invention are the curable silicones, and for example the two grades of elastomers and resins for example as exposed hereinafter. In other words, the two grades of fluid and emulsion silicone are more preferably excluded from the scope of the present invention.

Silicone elastomers or rubbers, are made from linear polymers that bear hydroxyl, vinyl or other reactive side chains. They can be cross-linked in various ways to yield highly elastic, more or less open-pored structures.

The constituents of silicone rubbers are long-chain polysiloxanes and various fillers such as pyrogenic (fumed) silica, chalk, quartz, mica and kaolin, which give elastomers good mechanical properties (elasticity, absorption, tear strength). The rubbers are rendered flexible by vulcanisation or curing, a process in which the chains are cross-linked. The different rubbers are classified according to the type of vulcanisation (cross-linking agents, temperature) and base-polymer viscosity employed and are broadly distinguished as room-temperature-vulcanising and high-temperature-vulcanising types.

Those two kinds of elastomers are encompassed within the meaning of silicone or polyorganosiloxanes as used in the present invention.

The components of a silicone rubber may still have to be cross-linked with each other (vulcanised or cured). There are three different types of cross-linking reactions:

Peroxide (-initiated) curing (where polymer contains vinyl groups).

Platinum catalysed addition curing (where polymer contains vinyl groups and cross-linking agent contains Si—H groups).

Tin catalysed condensation curing (between α,ω-dihydroxypolydimethylsiloxanes and silicic acid esters)

which all can be proceeded prior to the implementation of the method of treatment according to the present invention and some can be proceeded simultaneously with an optional curing step of the polymer conferring the modified property to the surface as exposed herein after.

Aside from the necessary reagents and reaction conditions, addition curing and condensation curing also require a suitable catalyst. A platinum catalyst is needed for addition, and a tin catalyst for condensation curing systems. In contrast, peroxide-initiated curing does not require a catalyst.

Silicone resins are highly branched, 3-D framework polymers that consist of randomly ordered, mainly trifunctional units. As a class of products, silicone resins range from being relatively low molecular reactive resins to high molecular materials with very diverse structures. All of them, however, are highly cross-linked.

Cross-linking is generally carried out at elevated temperatures over a long period of time, during which a temporary thermoplastic phase occurs. Silicone resins and their low molecular precursors are the basis of silicone masonry protection agents, such as binders for silicone resin emulsion paints for facades.

A particular class of silicones to which the method of the present invention is preferably adapted is constituted by the polydimethylsiloxane or PDMS, showing the following chemical formula:

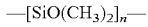

As far as the elastic solid or semi-solid similar to rubber are more preferably aimed at in the framework of the present invention, n is more preferably between 1 and 20 000.

Indeed, when n is very low the manufactured polymer can be a thin pourable liquid, which is preferably excluded from the scope of PDMS used in the framework of the present invention.

All the silicones which may be treated by the method according to the present invention may be manufactured through conventional processes.

The method according to the present invention is advantageously carried out on curable silicones. Indeed the treated substrates are advantageously keeping a durable or long-lasting form; in other words the treated substrates keep their surface. That is to say that the present method is preferably dedicated to substrates, which keep a substantially immovable surface after the treatment, i.e. excluding non-rigid treated substrates.

However the present method may be performed on cured or uncured silicones. Indeed, according to a particular embodiment of the present invention, the method may be performed on an uncured silicone substrate. In this case, the substrate to be treated does not necessarily present a rigid form or is not necessarily solid, provided that it presents a determined surface. Therefore the substrate before the treatment may be contained in a container in order to make it keep a form with a determined surface. The substrate to be treated may for example be a paste that is more or less deformable.

This embodiment can be of particular interest to decrease the number of steps in the manufacture of a surface-modified silicone. The range of embodiments is well illustrated in example 3 where some conditions were varied to obtain cured, uncured or partially cured silicone substrates ready to be treated by the method of the present invention.

Among the commercialized silicone substrates which may be treated by the method according to the present invention, the following may be cited: i) SYLGARD®184 sold by Dow Chemicals, which is supplied as a two-part kit comprised of liquid components, i.e. a base and a curing agent, ii) biomedical grade silicone NUSIL® MED 4750 from Nusil.

It is also to be noted that all forms of silicone surfaces may be treated by the present method. In particular, the silicone surface may take the form of particles, for example on a colloidal solution.

Silicon Substrate

Silicon substrates, which may be treated according to the method of the present invention, are those bearing Si—H groups. In fact, a hydrogen-terminated silicon surface is a silicon substrate whose native oxide ($SiO_2$) thin film is removed for example by dipping into hydrogen fluoride aqueous solution and hydrogen atoms are left on it. Said method of preparation of the surface is well known to the one skilled in the art.

Any kind of composite material comprising a partially hydrogen-terminated silicon surface is also understood to be suitable to be treated by the method according to the present invention.

Example 11 illustrates the method according to the present invention applied to a silicon substrate.

Modified Properties

The method according to the present invention allows the surface modification of substrates bearing Si—H groups in view of a wide range of its physical and/or biochemical properties.

In other words, for the sake of rendering substrates bearing Si—H groups usable in a broader range of technical applications, the method according to the present invention allows to confer to said substrate or surface thereof among all: hydrophilic character; improved hydrophobic character, cytotoxic properties such as antibiotic, bactericidal, viricidal and/or fungicidal properties; cell-adhesion property; improved biocompatibility such as protein repellency or adhesion property; electric conductivity property and reactivity property which renders said surface able to immobilize biomolecules.

According to a first embodiment of the present invention, the method of treatment is mainly dedicated to confer hydrophilic character to a substrate or a surface thereof bearing Si—H groups. In such a case, the treated substrate can find applications for the manufacture of optical articles, and in particular of lenses for silicone substrates and biosensors for hydrogen-terminated silicon substrates.

According to a second embodiment of the present invention, the method of treatment is mainly dedicated to confer improved hydrophobic character to a substrate or a surface thereof bearing Si—H groups. In such a case, the treated substrate can find applications for the manufacture of construction materials for silicone substrates and biosensor for hydrogen-terminated silicon substrates.

According to a third embodiment of the present invention, the method of treatment is mainly dedicated to confer antibacterial properties to the substrate or the surface thereof bearing Si—H groups. In other words, said method prevents the formation of biofilms and the development of bacterial colonies.

In particular, when the method is dedicated to confer bactericidal properties to a silicone substrate, it can find applications in medical (clinical hospital and personal care), as well as in domestic and industrial (food industry for example) environments.

According to a fourth embodiment of the present invention, the method of treatment is mainly dedicated to confer improved biocompatibility such as protein repellency or adhesion property to a substrate or a surface thereof bearing Si—H groups. In such a case, the treated substrate can find applications for the manufacture of biomedical implants for silicone substrates and biosensors for hydrogen-terminated silicon substrates.

According to a fifth embodiment of the present invention, the method of treatment is mainly dedicated to confer electric conductivity property to a substrate or a surface thereof bearing Si—H groups. In such a case, the treated substrate can find applications for the manufacture of medical devices for silicone substrates and electronic devices for hydrogen-terminated silicon substrates.

According to a sixth embodiment of the present invention, the method of treatment is mainly dedicated to confer reactivity property which render said surface able to immobilize biomolecules property to a substrate or a surface thereof bearing Si—H groups. In such a case, the treated silicone can find applications for the manufacture of biosensors, biodiagnostic, bioaffinity and related applications or of biomedical materials such as stents, shunts, catheters or lenses for example provided with coatings exhibiting for example antithrombogenic or antifouling properties for silicone substrates and biosensors for hydrogen-terminated silicon substrates.

Polymer

The polymer according to the present invention may be any kind of polymer and for example a homopolymer or a copolymer.

The reactive site able to attach to the substrate or the surface thereof bearing Si—H groups is preferably an alkene group and most preferably a vinyl group, or an acetylene group.

According to one embodiment of the present invention, the polymer comprises at least three monomer units comprising an alkene group, most preferably a vinyl group, or an acetylene group. Said alkene or acetylene group may be intrinsically present in the monomer units or come from a functionalization prior to, during or after obtaining the polymer according to the present invention.

The molecular weight of the polymer is greater than 1 000 g/mol, preferably greater than 3 000 g/mol and more preferably greater than 5 000 g/mol. In a preferred embodiment, said molecular weight may vary between 10 000 and 8 000 000 g/mol depending of the nature of the polymer, more preferably between 20 000 and 2 000 000 g/mol, in particular between 30 000 and 700 000 g/mol and for example between 50 000 and 500 000 g/mol.

Polymeric Chain Backbone

The polymer and for example the homopolymer or the copolymer according to the invention may comprise a polymeric chain backbone chosen among polyethylene, polyacrylamide, polyacrylate, polyvinyl derivatives (e.g. polyvinylpyrrolidone), polystyrene, optionally substituted on the phenyl group by a ($C_1$-$C_4$)alkyl, polyalcohol (e.g. polyvinylalcohol, polyallylalcohol), polyvinylbenzyl, polyamine (such as polyethyleneimine, polyallylamin), polymethacrylate (such as polymethylmethacrylate), polymethacrylamide, polyether (e.g. polyethylene glycol), polyester (e.g. poly(DL-lactide)), polyamide, polyurethane, poly(ethylene-alt-succinimide), polysaccharide derivatives (such as dextran, cellulose, hydroxyethylcellulose, methylcellulose), polyureas, polyaniline, polypyrrole, polythiophene, and poly(diallyldimethylammonium) which inherently contains a quaternary ammonium group and may be represented by the following formula:

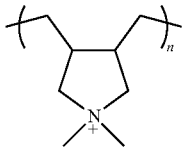

Some of said various polymeric chain backbones are illustrated hereinafter in schemes P1 to P7.

Homopolymer

In the embodiment of the present invention where the polymer is a homopolymer, each monomer bears at least a reactive site able to attach to the substrate surface by covalent bonds and at least a molecule or a part thereof able to confer a physical and/or biochemical property to the substrate surface. They are hereinafter called "mixed monomers".

Some monomers are described hereinafter in the paragraph "copolymer" which are "mixed monomers", which can be the polymerized to form a homopolymer according to the present invention.

Said homopolymers are synthesized by methods known to one skilled in the art.

Copolymer

The copolymer according to the present invention contains at least a monomer of type A and at least a monomer of type B as described in the following. Said copolymer may be qualified as a "silicone surface-property modifier copolymer".

The copolymer may be any type of copolymer, i.e. among all a block copolymer or a statistical copolymer but is advantageously a statistical copolymer. Therefore, the following description is more particularly dedicated to statistical copolymers so that unless stated otherwise, the term "copolymer" refers to statistical copolymer.

The ratio between the two types A and B of monomer units contained in the statistical copolymer may be continuously adjusted to optimize the desired properties of the substrate or the surface of said substrate.

The monomer units of type A and B are available commercially or by simple derivatization of existing monomer units.

The selection of each monomer of the copolymer can vary according to the required effect of the copolymer in view of the desired properties for the substrate or the surface thereof.

Each monomer unit may be distributed along the statistical copolymer chain in no specific order and the percentage of monomer unit of type A out of the total amount of monomer units may vary between 0.1% to 50%, preferably between 1% to 10% whereas the percentage of monomer of type B out of the total amount of monomer units may vary between 50% to 99.9%, preferably between 90% to 99%.

The copolymer may contain various monomer units of type A with different types of reactive sites able to attach to the silicone substrate or the surface of said substrate, by covalent bonds.

The copolymer may also contain various monomer units of type B with able to confer various properties to the silicone polymer surface.

Therefore, the copolymer may for example be a copolymer of the AB type or of the AA'B type or of the ABB' type, where A' is a variant of a monomer of the A type and B' is a variant of a monomer of the B type.

The copolymer is preferably a linear copolymer. But according to another aspect of the invention, the copolymer may be cross-linked after carrying out the treatment method according to the present invention, to improve the stability and the durability of the grafted layer. It is however obvious that the number of cross-linking points must not exceed a number that could affect the required effect or the grafting affinity.

According to a preferred embodiment of the present invention, the cross-linking of the copolymer occurs simultaneously with the curing step as exposed hereinafter in the paragraph "METHOD OF TREATMENT".

According to a preferred aspect of the invention, any of the monomer of type A or of type B may contain chemical groups that improve the solubility within the liquid medium. In particular, according to a most preferred embodiment detailed hereafter, it may be advantageous to use water-soluble copolymers for user-friendliness reasons. In this particular case, any or both of the monomer of the A or the B type can include hydrophilic groups or water-soluble chains.

According to one embodiment of the instant invention, the reactive sites of monomer unit of type A and/or the molecules conferring the various properties of monomer unit of type B may, independently one from each other form part of the chain backbone.

According to another embodiment of the instant invention, the reactive sites of monomer unit of type A and/or the molecules conferring the various properties of monomer unit of type B may, independently one from each other, be linked to concerned monomers via a lateral chain.

The lateral chain on the one hand forming the lateral chain of the monomer unit of type B and on the other hand forming the lateral chain of the monomer of type A may be of various structures.

A combination of the two previously cited embodiments also forms part of the present invention.

Monomer of Type B

As previously stated, the molecule or part thereof conferring the various properties of monomer unit of type B may be a part of the lateral chain or of the backbone chain. For simplification reasons, said chemical group is called "property-modifier group" in the framework of the present invention.

Said property-modifier group also encompasses the precursor of said property-modifier group. Indeed the functionalization of the surface may occur before the binding of the final biomolecule which will impart the modified property to the substrate surface. In such a case, the biomolecules bearing reactive functionalities reacts with the precursors to form covalent linkage. For example, when the precursor is an activated carboxylic acid, the reactive functionalities of the biomolecule can be a nucleophile group, for example a thiol, an alcohol or an amine group.

Generally said precursor form an activating group that is used in peptide synthesis, for example carboiimide, an anhydride, an activated ester or an azide.

In an embodiment of the invention, said precursor is selected form the group consisting in:

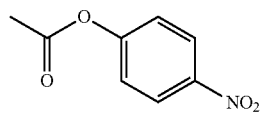 (a)

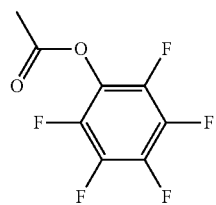 (b)

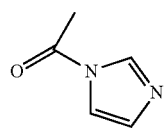 (c)

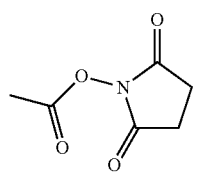 (d)

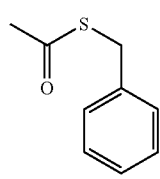 (e)

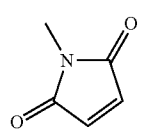 (f)

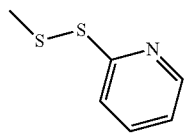 (g)

Examples of Backbone Chain of Monomer of Type B Containing the Property-Modifier Group Among the monomer of type B conferring antimicrobial properties, the following may be cited: poly(diallyldimethylammonium) . . . , among the monomer of type B conferring hydrophilic properties, the following may be cited: polysaccharide derivatives, polyvinylpyrrolidone, among the monomer of type B conferring anti-adhesive properties, the following may be cited: polyvinylpyrrolidone and among the monomer of type B conferring conductive properties, the following may be cited: polyaniline and polypyrrole.

Examples of Lateral Chain of Monomer B Contain the Property-Modifier Group

The lateral chain of the monomer unit of type B is selected for its ability to confer the desired property or properties to the silicone substrate or surface of said substrate.

Most of the time, one chemical group is responsible for the property modification. In other words, the massive presence of said chemical group within the copolymer imparts the expected modified property to the silicone substrate at the macroscopic and/or microscopic scale.

Among the lateral chain that may form part of the copolymer the following ones may be cited:
  lateral chain imparting improved hydrophilic properties, i.e. for example containing monosaccharides, zwitterionic (betaïne and phosphocholine derivatives) moieties or polymer chains of water-soluble polymers having a molecular weight of less than 5 000 g/mol, and more specifically less than 1 000 g/mol; polyethylene oxide (PEO); polyethylene glycol (PEG); amino-terminated polyethylene glycol (PEG-$NH_2$); polypropylene glycol (PPG); polypropylene oxide (PPO); polypropylene glycol bis(2-amino-propyl ether) (PPG-$NH_2$); polyalcohols, for example polyvinylalcohol; polysaccharides (e.g. dextran cellulose) and related compounds; poly(vinyl pyridine); polyacids, for example poly(acrylic acid); polyacrylamides e.g. poly(N-isopropylacrylamide) (polyNIPAM) and polyallylamine (PAM),
  Lateral chain imparting improved hydrophobic properties, i.e. for example containing fluorinated groups, ($C_1$-$C_{10}$)alkyl groups,
  lateral chain imparting improved biocompatible properties via protein repellancy, i.e. for example containing polyethylene glycol (PEG), polysarcosine, polyvinylpyrrolidone,
  lateral chain imparting electric conductivity property, i.e. for example containing polyaniline, polypyrrole, polythiophene,
  lateral chain imparting improved adsorption resistance, i.e. for example containing polyethyleneglycol (PEG),
  lateral chain imparting antibiotic, bactericidal, viricidal properties, which may contain aminopenicillanic acid that is known to interact with cell membranes,
  lateral chain imparting bactericidal properties, which may contain positively charged groups such as quaternary ammonium groups, quaternary phosphonium groups guanidinium groups, imidazolium groups and sulfunium groups,
  lateral chain imparting viricidal properties, which may contain quaternary ammonium groups (especially for bacterial viruses), quaternary phosphonium groups and guanidinium groups, imidazolium groups and sulfunium groups, lateral chain imparting fungicidal properties, which may contain quaternary ammonium groups, quaternary phosphonium groups, guanidinium groups, imidazolium groups and sulfunium groups.

Where the monomer unit of type B is selected for conferring to said copolymer some ability to extract microorganisms from a medium without killing them, only the previously cited monomers having not too high toxicity are convenient.

Thus, monomers containing quaternary ammonium groups having at least one, preferably two and more preferably three short alkyl chain(s) for example in $C_1$ to $C_6$, and in particular in $C_1$ are particularly advantageous for achieving the expected cell-adhesion.

Trimethylammonium groups are more particularly preferred.

It follows that the property-modifier group may be advantageously chosen among monosaccharides, zwitterionic (betaïne and phosphocholine derivatives) moieties or polymer chains of water-soluble polymers having a molecular weight of less than 5 000 g/mol, and more specifically less than 1 000 g/mol; polyethylene oxide (PEO); polyethylene glycol (PEG); amino-terminated polyethylene glycol (PEG-NH$_2$); polypropylene glycol (PPG); polypropylene oxide (PPO); polypropylene glycol bis(2-amino-propyl ether) (PPG-NH$_2$); polyalcohols, for example polyvinylalcohol; polysaccarides (e.g. dextran cellulose) and related compounds; poly(vinyl pyridine); polyacids, for example poly(acrylic acid); polyacrylamides e.g. poly(N-isopropylacrylamide) (polyNIPAM) and polyallylamine (PAM), fluorinated groups, ($C_1$-$C_{10}$)alkyl groups, polysarcosine, polyvinylpyrrolidone, polyaniline, polypyrrole, polythiophene, aminopenicillanic acid, quaternary ammonium groups, quaternary phosphonium groups guanidinium groups, imidazolium groups and sulfunium groups.

The term "fluorinated group" refers to a ($C_1$-$C_6$)alkyl group containing at least a fluor atom. Said fluorinated group may also be a perfluoro($C_1$-$C_6$)alkyl group.

The lateral chain of monomer unit of type B imparting a cytotoxic property can be represented by the following formula:

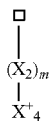

wherein:
☐ means the link to monomer B
m is 0 or 1,
$X_2$ represents an amine, an amide, an ester or a ketone function, an oligoethylene glycol, an arylene group, a ($C_1$-$C_6$)alkylarylene, or a ($C_1$-$C_8$)alkylene which may be interrupted by anyone of an amine, an amide or a ketone function, and
$X_4^+$ represents:
a trialkylammonium of formula:

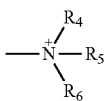

wherein:
$R_4$, $R_5$ and $R_6$ independently represent a ($C_1$-$C_{12}$)alkyl, hydroxy($C_1$-$C_{12}$)alkyl or fluoro($C_1$-$C_{12}$)alkyl group,
a ($C_1$-$C_4$)alkylpyridinium group of formula:

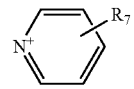

wherein $R_7$ represents a ($C_1$-$C_4$)alkyl,
a ($C_1$-$C_4$)alkylimidazolium group of formula:

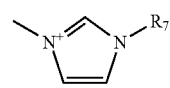

wherein $R_7$ is as described above,
a guanidinium group of formula:

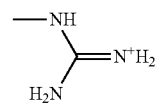

a trialkylphosphonium of formula:

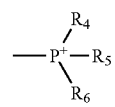

wherein $R_4$, $R_5$ and $R_6$ are such as defined above, or alternatively:

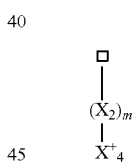

represents a monomer unit containing a 5- or 6-membered saturated ring containing a quaternary ammonium. An example of this alternative is represented with a statistical copolymer manufactured starting from the homopolymer poly(diallyldimethylammonium) of formula:

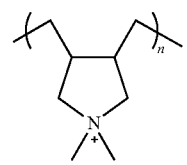

Monomer of Type A
As previously stated, the reactive sites of monomer unit of type A may be part of the lateral chain.
Lateral Chain of Monomer A
The lateral chain of the monomer unit of type A can be represented by the following formulas:

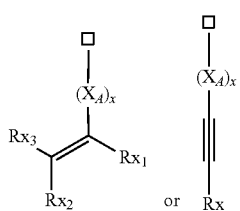

wherein:
☐ means the link to monomer A,
x means 0 or 6,
Rx, Rx$_1$, Rx$_2$ and Rx$_3$ mean independently a hydrogen atom or a (C$_1$-C$_2$)alkyl group and Rx$_1$ and Rx$_2$ may form a 5- or 6-membered ring such as a cyclohexene, X$_A$ means an arylene group, a (C$_1$-C$_8$)alkylene group, a (C$_1$-C$_6$)alkylarylene group, where said groups may be substituted by anyone of a (C$_1$-C$_4$)alkyl, an halogen atom a —OR$_1$, or —NR$_1$R$_2$ group and/or the (C$_1$-C$_8$)alkylene and/or (C$_1$-C$_6$) alkylarylene groups may be interrupted by anyone of an amine, an amide or a ketone function, said group X$_A$ optionally containing at least one property-modifier group as previously listed by carbon atom replacement or by substitution, and
R$_1$ and R$_2$ independently mean a (C$_1$-C$_4$)alkyl or a hydrogen atom.

The term "(C$_1$-C$_6$)alkyl" as used herein refers to a straight or branched-chain hydrocarbon radical of one to six carbon atoms and their cyclic derivatives, unless otherwise indicated. Included within the scope of this term are such moieties as methyl, ethyl, isopropyl, n-butyl, t-butyl, t-butylmethyl, cyclopropyl, n-propyl, pentyl, cyclopentyl, n-hexyl, cyclohexyl, cyclohexylmethyl, 2-ethylbutyl, etc.

The term "halogen" refers to a fluorine, chlorine, bromine or iodine atom. Bromine and chlorine are preferred halogen atoms in the framework of the present invention.

The term "arylene" as used herein refers to a bivalent radical group selected among phenylene, biphenylene, naphtylene, dihydronaphtylene, tetrahydronaphtylene, indenylene and indanylene.

The homopolymer poly(diallyldimethylammonium) as recited above, when in the commercially available form inherently contains some vinyl groups on its backbone left from polymerization step. Therefore, it is able to react with the silicone substrate directly without any previous transformation. Said vinyl groups inherently contained in the commercial product, even if present in small amounts are sufficient to render the copolymer able to attach to the silicone substrate and to offer the desired property. Example 3 illustrates this particular copolymer use. Said copolymer is called copolymer 4 in said Example 3.

Example of Monomer Unit of Type A

A monomer unit of type A can be represented within the copolymer by the compound of formula (I):

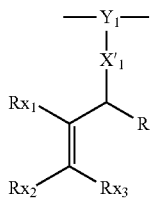

(I)

wherein:
X'$_1$ represents a —[O(CH$_2$)$_p$]$_q$— group, where p varies from 2 to 4 and q varies from 1 to 6, an arylene group, a (C$_1$-C$_6$)alkylenarylene group, or a (C$_1$-C$_8$)alkylene group, optionally one of the carbon atom in the alkylene group being replaced by a nitrogen atom, preferably being a quaternary ammonium, by a quaternary phosphonium, by a (C$_1$-C$_4$)alkylpyridinium, by a (C$_1$-C$_4$)alkylimidazolium, or by a guanidinium group,
R is a hydrogen atom or a (C$_1$-C$_4$)alkylene group,
Rx$_1$, Rx$_2$ and Rx$_3$ mean independently a hydrogen atom or a (C$_1$-C$_2$)alkyl group and Rx$_1$ and Rx$_2$ may form a 5- or 6-membered ring such as a cyclohexene, and
Y$_1$ is a part of the polymeric chain backbone and can advantageously be an ethylene optionally substituted by a methyl group, an acrylamide, an ethyleneimine, a methylmethacrylate group or a propylene glycol.

Example of Monomer Unit of Type B

A monomer unit of type B can be represented within the copolymer by the compound of formula (I):

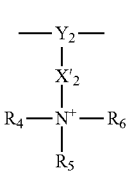

(II)

wherein:
R$_4$, R$_5$ and R$_6$ independently represent a (C$_1$-C$_6$)alkyl, a hydroxyl(C$_1$-C$_6$)alkyl or a fluoro(C$_1$-C$_6$)alkyl,
X'$_2$ represents a (C$_1$-C$_4$)alkylene, an oligoethylene glycol or an arylene group, Y$_2$ is a part of the polymeric chain backbone and can advantageously be an ethylene optionally substituted by a methyl group, an acrylamide, an ethyleneimine, a methylmethacrylate or a propylene glycol.

When the monomer comprises a quaternary ammonium, the counterion X$_3^-$ may be a halogen, a mesylate, a tosylate, a sulfonate, a phosphate, a hydrogenophosphate, an ammonium dihydrogenophosphate, a sulfate or a nitrate.

Preferred Embodiments of Copolymers

The present invention relates more particularly to a statistical copolymer containing both a bactericidal and/or fungicidal substance, which is preferably a positively charged groups and vinyl groups, intended to covalently attach to the silicone surface.

The positively charged groups are advantageously quaternary ammonium groups, quaternary phosphonium groups and/or guanidinium groups.

The present invention also more particularly relates to a statistical copolymer containing both a property-modifier group imparting improved hydrophilic properties, which is preferably polysaccharide derivatives (e.g. hydroxyethylcellulose, methylcellulose) and vinyl groups, intended to covalently attach to the silicone surface.

The copolymer is covalently attached to the surface through the coupling of the vinyl groups with the surface Si—H bonds, whereas the quaternary ammonium groups and the polysaccharide derivatives (e.g. hydroxyethylcellulose, methylcellulose) provide respectively the necessary positive charges for the cytotoxic or cell-adhesion activity and the expected hydrophilic character.

The use of said particular statistical copolymer comprising monomer units of formula (I) and monomer units of formula (II) as described above presents numerous advantages. Indeed the deposition method is extremely simple: the modification of the silicone surface with this particular statistical copolymer involves a one-step reaction in water, followed by a drying step. Water can indeed be the liquid medium, provided the statistical copolymer comprises a sufficient amount of quaternary ammonium groups, which renders said copolymer soluble in water. This characteristic is a further advantage of the present invention over the known methods to treat silicone surfaces, which are generally performed in organic solvents and are not environmentally friendly.

Copolymer Synthesis

The statistical copolymers according to the present invention are synthesized by copolymerization of monomers using methodologies well known to those skilled in the art.

According to a preferred embodiment of the present invention, the starting polymer is a homopolymer.

The present invention further relates to a preparation process of the surface-property modifier copolymer according to the invention, wherein a starting homopolymer comprising at least two reactive sites is reacted at least with:

- a reagent that by reacting with at least one reactive site gives rise to a copolymer containing a reactive site able to attach to a substrate or a surface thereof bearing Si—H groups by covalent bonds and/or
- with another reagent that by reacting with at least one reactive site gives rise to a copolymer able to confer modified properties to a substrate or a surface thereof bearing Si—H groups.

Both reactions may be performed in same time or successively, i.e. in two steps in an indifferent order.

The reactive sites which may be present on the starting homopolymer, which are illustrated in the here beneath schemes P2 to P7, may be chosen among halogen atoms, activated carboxylic acids such as anhydrides, acyl halides for example acyl chlorides, activated esters, for example N-hydroxysuccinimid esters and alcohol, amines, for example aliphatic or aromatic amines.

These starting homopolymers are well known to the one skilled in the art or are commercially available.

According to another preferred embodiment of the present invention, the preparation process according to the present invention is performed in two steps, the first one, giving rise to only one type of monomer units, i.e. of type A or type B and leaving a portion of the starting monomer units unreacted and the second one giving rise to monomer units of the other type from the unreacted monomer units after the first step, whereas the monomer units transformed in the previous step stay unchanged during this second step.

Alternatively, the statistical copolymer according to the present invention may be manufactured via polymerization starting from two distinct monomers. Said alternative is illustrated in scheme P8 reported below.

The synthesis of one of said statistical copolymers has been illustrated thereafter in the examples.

Moreover the following scheme P1 illustrates the general procedure, starting form a homopolymer, to obtain a statistical copolymer according to the present invention, i.e. comprising monomer units of type A containing a vinyl group and monomer units of type B comprising a property-modifier group, in particular as listed above.

Scheme P1

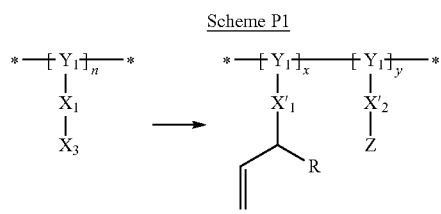

In said scheme P1, $Y_1$, $X'_1$ and R are as defined above, $X_3$ represents a reactive site as described above, Z represents a property-modifier group, in particular as listed above and $X_1$ has the same meaning as $X'_1$. In one embodiment, $Y_1$ may comprise a property-modifier group.

Further examples of preparation process of statistical copolymers bearing a lateral chain comprising for example a quaternary ammonium salt or polysaccharide derivatives as well as a vinyl moiety are given below in scheme P2 to scheme P8 starting from various polymers or monomers.

Scheme P8 and P9 illustrate the manufacture of a copolymer according to the present invention starting from two distinct monomers.

Scheme P2

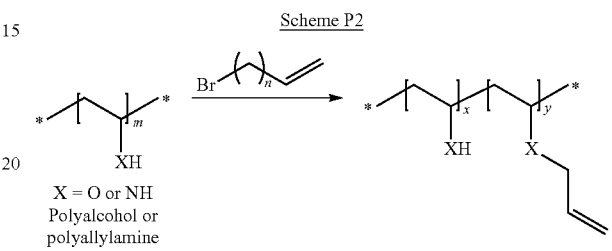

X = O or NH
Polyalcohol or polyallylamine

Scheme P3

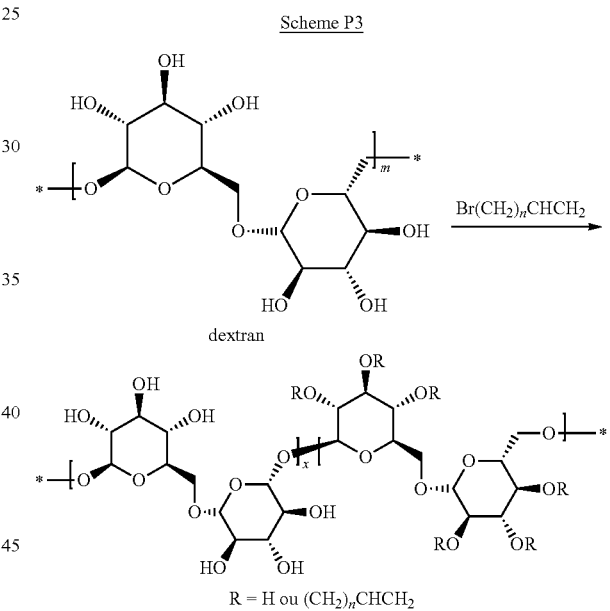

dextran

R = H ou $(CH_2)_nCHCH_2$

Scheme P4

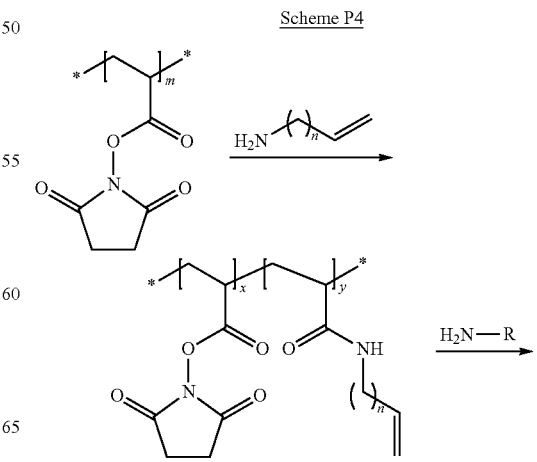

-continued
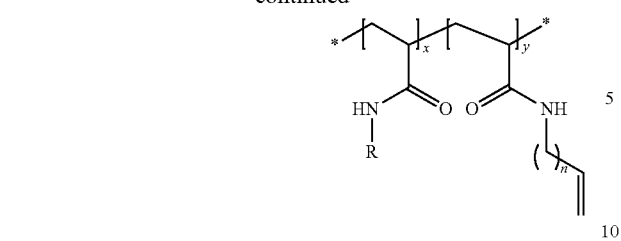
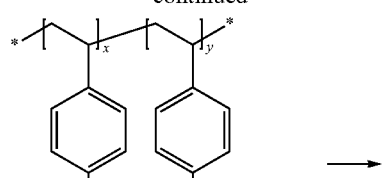
Scheme P5
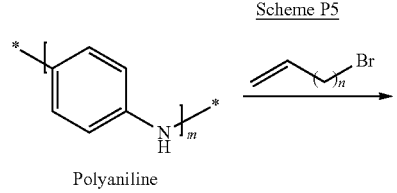
Polyaniline
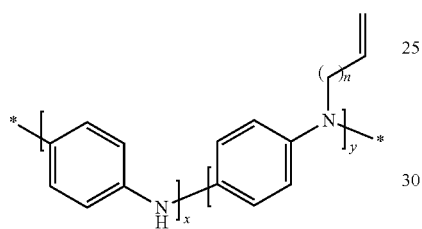
Scheme P6
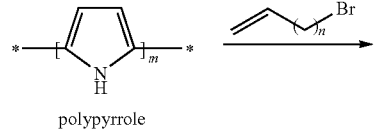
polypyrrole
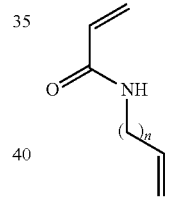
Scheme P8
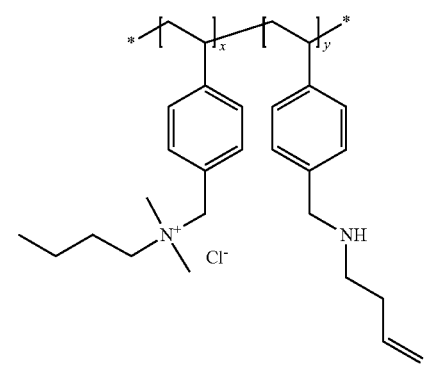
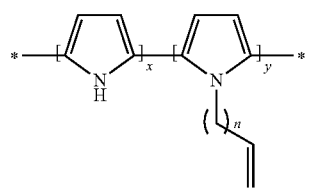
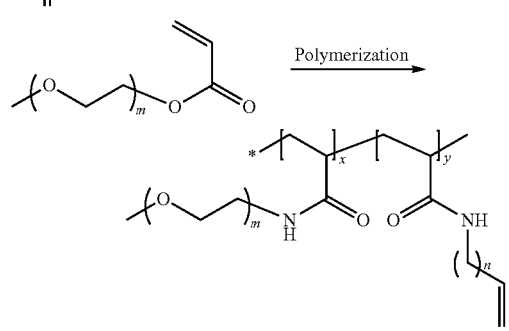
Scheme P7
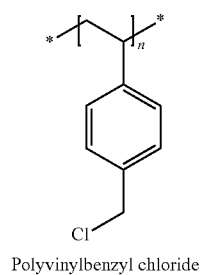
Polyvinylbenzyl chloride
Scheme P9
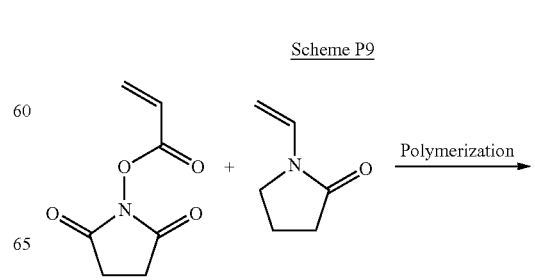

-continued

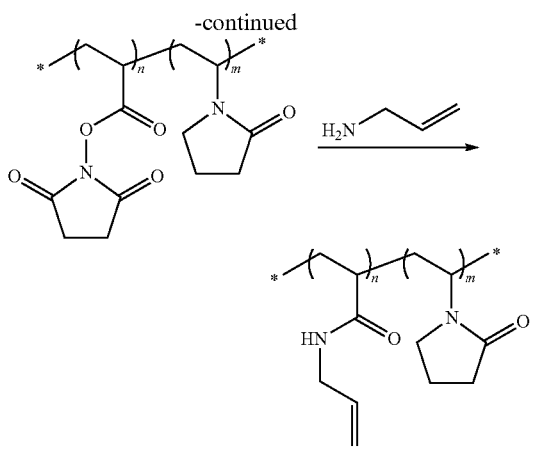

Composition Comprising a Statistical Copolymer

The present invention also relates to a composition comprising an efficient amount of statistical copolymer.

The solvent optionally present in the composition may be any one that can solubilize the copolymer. In the preferred embodiment of water-soluble copolymer, the composition is miscible with water and most preferably contains in majority water as a solvent. Other solvents such as dimethylsulfoxide, dimethylformamide, acetonitrile, N-methylpyrrolidone, 2-methoxyethyl ether, methanol, isopropanol and ethanol can also be used.

The concentration of the statistical copolymers in said composition is any amount that provides the desired property to the silicone substrate or the surface of said silicone substrate after the treatment. This concentration will vary with respect to the molecular structure, the desired properties, and the solvent. Typically, the weight concentration of the statistical copolymer in the composition can vary between 0.1 and 1% in the case of water, and between 0.1 and 1% in the case of ethanol.

Method of Treatment

As already mentioned above the method of treatment may be performed on cured or uncured silicones.

The present invention relates to a method for treating a silicone substrate or a surface thereof to confer to it a physical and/or biochemical surface-modified property, for example such as previously recited, characterized in that it comprises at least a step consisting of exposing, within a liquid medium, said substrate or said surface thereof with at least a copolymer, said copolymer containing at least a monomer unit of type A including at least a reactive site able to attach to said substrate or said surface by covalent bonds and at least a monomer unit of type B including at least one molecule able to confer said modified property to said substrate or said surface thereof, said step being carried out in efficient conditions to promote the covalent grafting of said copolymer to said silicone substrate or surface thereof and the molecular weight of said copolymer being greater than 1 000 g/mol.

Preferably the method of treatment comprises at least a step of immersion of the silicone substrate within a liquid medium wherein the copolymer is solubilized, followed by a step of evaporation of said liquid medium, optionally by heating.

For the purpose of performing the method of treating a surface according to the present invention block copolymer may also be used, with the proviso that they comply with the here-above described characteristics in terms of presence of the required monomer units.

In other words, all the description of each of the monomer unit of type A and of type B in the preceding paragraph "STATISTICAL COPOLYMER" applies to any copolymer used for the method of treatment according to the present invention.

The method using the statistical copolymer more particularly described above, comprising an alkene group and more specifically a vinyl group, or an acetylene group in monomer A and a quaternary ammonium group in monomer B, to impregnate a surface of a silicone substrate to confer bactericidal and/or fungicidal properties or cell-adhesion property also forms part of the invention.

The liquid medium is advantageously an aqueous medium.

The step consisting in exposing the substrate with the polymer or copolymer according to the present invention do not require the use of a catalyst, even if it can optionally be used during this grafting step. This aspect represents a further advantage in comparison to the methods known in the art to modify surfaces.

The method according to the present invention may comprise, previous to the treatment step, a step consisting in chemically activating the silicone substrate surface to generate Si—H groups by using for example i) a procedure described in the following reference Chen H., Zhang Z., Chen Y., Brook M. A., Sheardown H., Biomaterials, 2005, 26, 2391-2399 already cited or ii) an incubation of silicone substrates in an alcoholic solution of Si—H rich oligomers such as DC1107 (Aldrich) at 70° C. during 12 hours.

However, in particular in the case of PDMS, it does not require such a pretreatment, which is a further advantage of the method according to the present invention in terms of simplicity.

According to a preferred embodiment, the invention relates to a method for treating a surface of a substrate containing Si—H groups as set forth in the above, and further comprising a curing step.

The curing step creates conditions that facilitate cross-linking of the alkene or acetylene groups with the surface Si—H groups, and also between themselves.

Various conditions may be chosen to achieve such curing of the polymer according to the present invention. Indeed, said condition may consist in heating (or drying) or in a photochemical activation or a mixture thereof.

The heating can be performed at a temperature ranging from 10 to 200° C., preferably from 25 to 150° C. and most preferably from 70 to 120° C.

Said heating step may advantageously been carried out during a period ranging from 1 minute to 24 hours, for example between 60 minutes and 12 hours.

The photochemical activation may be proceeded by any known method.

The curing step may also be followed by a washing step in order to remove the non covalent attached copolymer on the surface of the substrate. For example, the substrate may be washed within several water baths, for example during several days.

Surface-Modified Substrate

The present invention further relates to a substrate provided with a given property, such as previously recited, obtainable by a method according to the present invention.

According to a particular embodiment it relates to substrates to which at least one of the following properties can be conferred by a proper chemical treatment: hydrophilic character; improved hydrophobic character, cytotoxic properties such as antibiotic, bactericidal, viricidal and/or fungicidal properties; cell-adhesion property; improved biocompatibility such as protein repellency or adhesion property; electric conductivity property and reactivity property which renders said surface able to immobilize biomolecules.

Said treated substrates do not request particular storage conditions to keep their modified properties. The surface treatment is indeed advantageously resistant to water and other solvents up to certain limits and is to be noticed that said modified-property lasts more that modified-property obtained by the methods previously known in the art In the framework of the preferred embodiment as exposed above, when a silicone substrate endowed with bactericidal and/or fungicidal propertied is obtained, the density of active antibiotic sites per unit surface area may range from $10^{14}$ to $10^{16}$ per cm$^2$.

When the silicone substrate may be used to promote cell-adhesion without bactericidal activities, the density of active sites has to be adjusted with respect to the chemical nature of the considered reactive site and more particularly by taking account its cytotoxic power. This adjustment may be performed by the man skilled in the art.

For example, when the cell-adhesion is promoted by a substrate exhibiting trimethylammonium groups as reactive sites, the density in active sites per unit surface is generally equal or lower than $10^{14}$ per cm$^2$.

The silicone substrate is then to be considered as a kind of probe useful to perform analysis of the isolated bacteria. This tool is for example of interest in the food industry where it is always avoided to stop the production line.

The conditions of deposition of the statistical copolymer more particularly described above, comprising an alkene group in monomer unit of type A and a quaternary ammonium group in monomer unit of type B is illustrated thereafter in the examples and the corresponding antimicrobial activity of such surfaces has then been tested against *E. coli* bacteria.

Depending on the mass of said polymer deposited, the thickness of the deposited layer can range between 1 and a few tens of nanometers. The thickness can advantageously be measured by ellipsometry on silicon wafers in particular for silicone substrates. The resulting layer is a thin polymeric gel that is very robust against solvents and mechanical friction.

The charge density (for example, as measured by fluorescein derivatization) for good cytotoxic properties against *E. coli* for the copolymer as illustrated in the example is advantageously over $10^{15}$ per cm$^2$, more preferably over $10^{16}$ per cm$^2$ and can typically range between $10^{14}$ and $10^{16}$ per cm$^2$.

The invention more particularly relates to a silicone substrate endowed with antibiotic properties characterized in that monomer of type B contains quaternary ammonium and the density of active antibiotic sites per unit surface area ranges from $10^{14}$ to $10^{16}$ per cm$^2$.

The density of quaternary ammonium groups can for example be measured by the fluorescein derivatization method.

It has been demonstrated and illustrated in the examples that substrates treated with the illustrated copolymer can kill all absorbed *E. coli* bacteria within 10 minutes.

A treated substrate may be retreated for further impregnation and curing steps according to the method as described above. Said retreated substrates are also encompassed within the scope of the present invention.

Use of the Treated Substrate

The present invention also encompasses the use of the surface-modified substrate of the invention described above, and which can be obtained by the method described above and illustrated in the following examples.

The use of a silicone substrates of the invention for decontamination purposes may be of interest to a number of industrial fields, such as health, hygiene and agro-alimentary industries. Examples are:

using a substrate for the production of containers for medical use, such as pouches, tubes, in particular disposables;

using a substrate for the production of medical apparatus for ex vivo or in vivo organ treatment, such as renal dialysis cartridges;

using a substrate for the production of materials or equipment for dentistry or for cleaning teeth;

using a substrate for the production of implantable devices such as osseous or vascular prostheses or lenses (i.e. catheter);

using a substrate for the decontamination of domestic fluids, in particular water and beverages (fruit juices, milk, wine, etc), or other fluid foodstuffs;

using a substrate for the decontamination of industrial fluids, for example cutting fluids, lubricants or petroleum fluids such as gasoil, gasoline or kerosene.

The present invention further relates to the use of silicone substrates of the present invention, as a tool to isolate bacteria from a media.

As far as surface-modified silicon surfaces are concerned, their use may range form the manufacture of micoelectronic devices to the manufacture of biosensors.

The following examples illustrate the present invention.

EXAMPLES

General Methods

All chemicals were purchased from Aldrich (St. Quentin Fallavier, France).

NMR experiments were carried out on a Bruker Avance 300 MHz. IR spectra were obtained using a Nicolet Magna 550. The UV experiments were performed with lambda 800 spectrometer from Perkin Elmer.

Example 1

Synthesis of a Statistical Copolymer Conferring Bactericidal Properties

Scheme 1

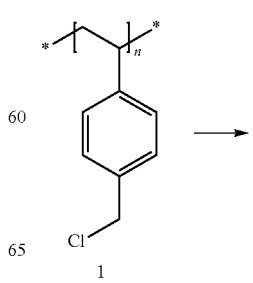

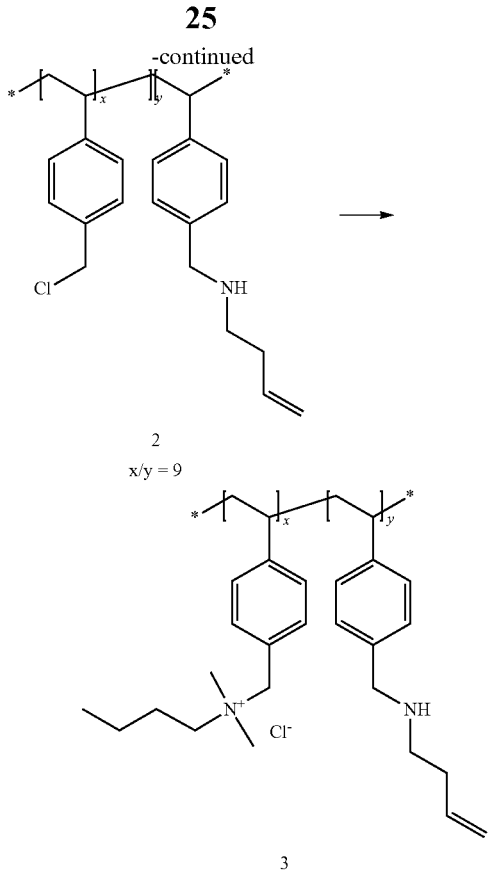

Synthesis of Copolymer 3

(See scheme 1)

The starting material, poly-(vinylbenzylchloride) 1 (2 g, Mn=55000, Ip=1.82), was dissolved in 50 mL dry tetrahydrofuran by stirring at room temperature during 30 minutes. Then 3,4-butene amine (120 µL, 1.3 mmol) was added in 10% stoichiometric ratio and the mixture was stirred under reflux during 24 hours at 50° C. N,N-dimethyl butylamine (8.2 mL, 57.5 mmol) was added to the precedent solution and 30 mL of ethanol was added to the solution after 1 h of stirring because of the copolymer precipitation. The reaction was allowed to stir for 24 h at 50° C. The solution was after concentrated and the resulting product 2 was dissolved in 50 mL of ethanol. Then, N,N-dimethyl butylamine (8.2 mL, 57.5 mmol) was added to this ethanol solution in order to complete the conversion of the chloride groups into quaternary ammonium. After stirring for 24 h at 50° C., the copolymer 3 was precipitated in diethyl ether, dried under vacuum, dissolved in water and lyophilised (yield: 83%). $^1$H NMR (300 MHz, D$_2$O) δ 7.02 and 6.47 (m; 4H; CH=C$\underline{H}$); 4.16 (m; 2H; —Ar—C$\underline{H}_2$—N$^+$); 2.70 (m; 8H; C$\underline{H}_3$—N$^+$ et —CH$_2$—C$\underline{H}_2$—N$^+$), 1.3-2 (m; 3H; —C$\underline{H}_2$—C$\underline{H}$—Ar); 0.9-1.3 (m; 4H; —C$\underline{H}_2$—C$\underline{H}_2$—CH$_3$); 0.74 (m; 3H; —CH$_2$—C$\underline{H}_3$); FTIR-ATR (diamond): $\nu_{O-H(water)}$=3374 cm$^{-1}$; $\nu_{=C-H}$=3023 cm$^{-1}$; $\nu_{CH2,CH3}$=2990-2770 cm$^{-1}$; $\nu_{C=C(aryl\ and\ butene)}$=1631 cm$^{-1}$; $\delta_{CH2,CH3}$=1482-1380 cm$^{-1}$; $\delta_{=C-H}$=866-810 cm$^{-1}$; complete disappearance of $\nu_{Ar-Cl(PVBC)}$=1263 cm$^{-1}$; UV (water): $\lambda_{max}$=264 nm (ε=476 M$^{-1}$·cm$^{-1}$); $\lambda_{max}$=219 nm (ε=6828 M$^{-1}$·cm$^1$); $\lambda_{max}$=187 nm (ε=54186 M$^{-1}$·cm$^{-1}$).

Copolymer 3 accepts the use of a wide variety of solvents like methanol, ethanol, isopropanol and water.

Example 2

Grafting of the Copolymer 3 on the Silicone Substrate (SYLGARD®184) to Confer Bactericidal Properties 2.1. Preparation of the Silicone Materials (SYLGARD®184).

SYLGARD®184 silicone elastomer, base and curing agent, is supplied as two-part kit comprised of liquid components. The base and the curing agent are usually mixed in a 10:1 weight ratio. The mixture is agitated vigorously for about 5 to 10 minutes. Air-entrapped in the mixture is removed under weak vacuum; this may take 30 to 60 minutes depending on the amount of air intruded during mixing. Then, the mixture is cured at 70° C. for 24 hours.

2.2. Chemical Grafting of Polymers onto Silicone Materials

Samples are prepared by immersion of the silicone material within an aqueous polymer solution of 2 g/L followed by an evaporation of water at 70° C. over night. The quantity of the polymer solution put above the sample corresponds to a height of 1 cm. Then, samples are washed within several water baths during 3 days in order to remove the non covalent attached polymer on the surfaces.

It is to be noted that it is not necessary to add platinum catalyst during the grafting step since platinum is already contained in the materials and its catalytic quantity enough to ensure the hydrosyliation catalysis.

2.3. Characterization of Treated Surfaces

The UV traces (transmission mode) of the surfaces modified with the statistic cationic copolymer exhibit two characteristic bands of the grafted polymer, namely the one centred at 264 nm (DO=0.06) and the one centred at 219 nm (DO=0.87). The third characteristic band of the polymer (187 nm) is masked by the silicone cut-off. FTIR-ATR (diamond): $\nu_{O-H(water)}$=3374 cm$^{-1}$; $\nu_{CH2,CH3}$=2990-2770 cm$^{-1}$; $\nu_{C=C(aryl\ et\ butene)}$=1631 cm$^{-1}$; $\delta_{CH2,CH3}$=1482-1380 cm$^{-1}$.

2.4. Determination of Surface Charge Densities

The surface density of quaternary ammonium groups was measured by a colorimetric method based on fluorescent complexation and UV-VIS spectroscopy as described by Tiller et al. "designing surfaces that kill bacteria on contact", Proc. Natl. Acad. Sci. USA., 2001, 98, p. 5981-5985. Samples of 7×7 mm$^2$ were immersed in a solution of fluorescein sodium salt (1% in distilled water) for 10 minutes. Due to their negative charges, the fluorescent markers bind strongly to the cationic sites and the unreacted molecules can then be removed by exhaustive washing with distilled water. The bound fluorescein molecules were then exchanged by immersing the modified samples in a small volume (2 mL) of a solution of monovalent salt (hexadecyltrimethyl ammonium chloride, C$_{16}$H$_{36}$N$^+$Cl$^-$, 98%, Fluka, 0.5% in distilled water), and sonnicated for 45 min. After adding 0.3 mL of PBS (pH=7.2), the absorbance of the resulting solution was measured between 175 and 600 nm, and the concentration of fluorescein was calculated, taking a value of 77000 M$^{-1}$·cm$^{-1}$ for the extinction coefficient corresponding to $\lambda_{max}$=501 nm, the absorbance obtained at 501 nm being corrected by subtraction from the baseline. The density of cationic groups was then derived from this concentration: the charges measured are those corresponding to quaternary ammonium groups capable of forming an ionic complex with fluorescein.

2.5. Adhesion of Fluorescent Nanoparticles on Treated Surfaces

A 40 μL droplet of 1/10 dilution of Latex beads of carboxylate modified polystyrene (Sigma, L3530, 0.05 μm, 2.5% solids) was deposed and spread on the studied surfaces (1 cm$^2$). The beads were allowed to sediment on the substrate for 30 minutes. After that, the beads remaining in the solution were washed away by flushing the substrate with distilled water. Then, the surfaces were analysed by the epifluorescence microscope using the 63× water immersion objective. The adsorbed beads appear red.

2.6. Adhesion of Bacteria on Treated Surfaces

A 40 μL sessile droplet of E. coli (MG1655) suspension in distilled water (3.7×10$^8$ UFC/mL) was deposed and spread on the studied surfaces (1 cm$^2$). The bacteria were allowed to sediment on the substrate for 30 min. After that, the bacteria remaining in the solution were washed away by flushing the substrate with distilled water. A 40 μL droplet of a fluorescent marker (SYTO®9, molecular probes, L7012) with concentration of 3.34×10$^{-4}$ mmol/L was then deposed and spread on these surfaces for 15 min. Then, the surfaces were analysed using a commercial epifluorescence microscope (DMR Leica) equipped with 63× and 40× water immersion objective used for the optical observation. The adsorbed bacteria appear as green dots. The images were recorded with a colour CCD camera (Micropublisher, Qimaging) and analysed with a computer imaging system.

2.7. Determination of Bactericidal Efficiency

A 40 μL sessile droplet of E. coli suspension in distilled water (3.7×10$^8$ UFC/mL) was deposed and spread on the studied surfaces (1 cm$^2$). The bacteria were allowed to sediment on the substrate for 10 min. After that, the bacteria remaining in the solution were washed away by flushing the substrate with distilled water and then a 40 μL droplet of water was deposed and spread on the surfaces for 35 min. After, water is removed from surfaces and a 40 μL droplet of mixture of aqueous solutions of two fluorescent markers: the SYTO®9 (molecular probes, L7012, 2×10$^{-5}$ mmol/L) and the propydium iodide (L7007, molecular Probes, 1.2×10$^{-4}$ mmol/L), was then deposed and spread on these surfaces for 15 minutes. Then, the surfaces were analysed by the epifluorescence microscope using the 63× water immersion objective. The adsorbed bacteria appear as green dots if still viable and as red/orange dots if their membrane has been damaged following contact with quaternary ammonium groups.

It has been furthermore observed that the bactericidal property remains during about a hundred days.

Example 3

Comparative Deposition Study on Silicone Substrate with Various Copolymer and Various Cured Degrees of the Silicone (SYLGARD®184) to Confer Bactericidal Properties 3.1. The commercially available polymer (polydimethyldiallylammonium) sold by Sigma-Aldrich (Saint-Quentin Fallavier, France) represented by the following formula:

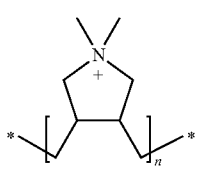

4 is able to react with the surface since this polymer bears some alkene groups on its backbone left from the polymerization step (a characteristic peak indicates the presence of alkene groups at 1633 cm$^{-1}$ by IR-ATR).

The present example demonstrates that the treatment method allows using silicone substrates with various cured degrees.

Moreover said Example also aims to demonstrate that, starting with the same silicone material as in Example 2.1, changing the ratio between the curing agent (containing Si—H bonds) and the base from 1/10 to 1/1 leads to an increase of charge density (entry 1 vs 2; entry 4 vs 5, Table 1).

The present Example has also investigated the reactivity of the copolymer 3 with cured and non cured PDMS materials and demonstrates that cured elastomer exhibit surprisingly, higher charge density than non cured (entries 2, 3 and 5, 6). However the surface treatment of non cured materials constitutes a procedure of particular interest for silicone industry and obviously biomaterials since silicone curation and surface treatment could be done in one single step. The biocidal properties of silicone treated surfaces were investigated using fluorescence microscopy and fluorescent markers of viability (SYTO®9 and propidium iodide) staining viable bacteria as green dots and non viable as red dots. All treated surfaces exhibit antimicrobial properties after 30 min in contact as shown in Table 2 hereinafter.

Charge densities of the surfaces prepared from the polymer 4 are comparable to those obtained with 3 in the same condition.

3.2. Results

TABLE 1

Charged density of different grafted PDMS surfaces (SYLGARD ®184)

| Entry | Reaction conditions$^a$ | Density of cationic charge (charge/cm$^2$)$^b$ |
|---|---|---|
| 1 | SYLGARD ®184 (1/10, C) + 3 | 4.8 × 10$^{14}$ |
| 2 | SYLGARD ®184 (1/1, C) + 3 | 8.5 × 10$^{14}$ |
| 3 | SYLGARD ®184 (1/10, PC) + 3 | 2.5 × 10$^{14}$ |
| 4 | SYLGARD ®184 (1/10, C) + 4 | 3.1 × 10$^{14}$ |
| 5 | SYLGARD ®184 (1/1, C) + 4 | 1.2 × 10$^{15}$ |
| 6 | SYLGARD ®184 (1/10, PC) + 4 | 2.0 × 10$^{14}$ |

$^a$SYLGARD ®184 silicone elastomer is supplied as two-part kit (base and curing agent). The base and the curing agent were mixed in a 10:1 or 1:1 weight ratio as indicated in brackets and were cured (C, 70° C. during 24 h) or partially cured (PC, 100° C. during 5 min) to obtain a solid. All reactions in Table 1 were done in water.
$^b$Density of cationic charge was determined by fluorescein titration.

TABLE 2

Bactericidal properties of different grafted PDMS surfaces

| Entry | Reaction conditions$^a$ | Density of E. coli (charge/cm$^2$) | % of dead bacteria |
|---|---|---|---|
| 1 | SYLGARD ® 184 (1/10, C) + 3 | 1.6 × 10$^6$ | 96.4 |
| 2 | SYLGARD ® 184 (1/1, C) + 3 | 7.4 × 10$^6$ | 99.4 |
| 3 | SYLGARD ® 184 (1/10, PC) + 3 | 1.8 × 10$^6$ | 99.5 |
| 4 | SYLGARD ® 184 (1/10, C) + 4 | 3.6 × 10$^6$ | 99.2 |
| 5 | SYLGARD ® 184 (1/1, C) + 4 | 5.2 × 10$^6$ | 99.9 |
| 6 | SYLGARD ® 184 (1/10, PC) + 4 | 3.8 × 10$^5$ | 100 |

$^a$SYLGARD ®184 silicone elastomer is supplied as two-part kit (base and curing agent). The base and the curing agent were mixed in a 10:1 or 1:1 weight ratio as indicated in brackets and were fully cured (C, 70° C. during 24 h) or partially cured (PC, 100° C. during 5 min) to have a solid.
"ND" means Not Determined

Example 4

Grafting of the Copolymer 3 on the Silicone Substrate (NUSIL® MED 4750) to Confer Bactericidal Properties

4.1. Preparation of the Silicone Materials (NUSIL® MED 4750)

NUSIL® MED 4750 silicone elastomer, base and curing agent, is supplied as two-part kit comprised of solid components. The base and the curing agent are usually mixed in a 1:1 weight ratio. The two parts were mixed mechanically for about 30 minutes. Then, the mixture is used for surface treatment i) uncured or ii) cured (120° C. for 2 hours).

4.2. Chemical Grafting of Polymer 4 onto Silicone Materials (NUSIL® MED 4750)

Same procedure is used and same remarks are valuable as those described in section 2.2 above.

4.3. Characterization of Treated Surfaces

The same characteristic UV traces (transmission mode) and FTIR-ATR spectra of the NUSIL® MED 4750 silicone surfaces modified with the copolymer 3 were obtained.

4.4. Determination of Surface Charge Densities

Same procedure than section 2.2 is used.

4.5. Results

TABLE 3

Charged density of different grafted PDMS surfaces (NUSIL ® MED 4750) in water

| Entry | Reactions condition[a] | Density of cationic charge (charge/cm$^2$)[b] |
|---|---|---|
| 1 | NUSIL ® MED 4750 (1/1, C) + 3 | $1.9 \times 10^{14}$ |
| 2 | NUSIL ® MED 4750 (1/1, NC) + 3 | $6.1 \times 10^{14}$ |

[a]NUSIL ® MED 4750 silicone elastomer is supplied as two-part kit (base and curing agent). The base and the curing agent were mixed in a 1:1 weight ratio as indicated in brackets and were used, cured (C, 120° C. during 2 h) or non cured (NC) before surface treatment. All reactions in Table 1 were done in water.
[b]Density of cationic charge was determined by fluorescein titration.

Example 5

Synthesis of the Statistical Copolymer 9

Scheme 2

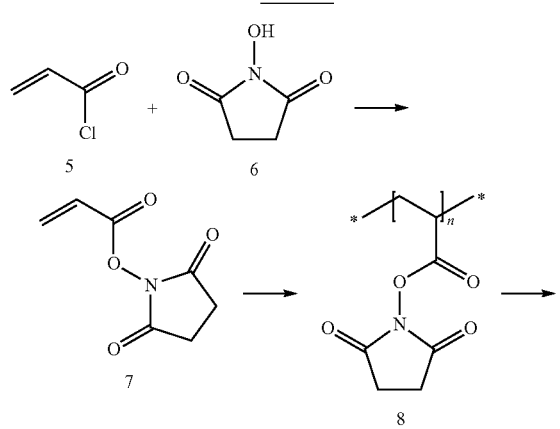

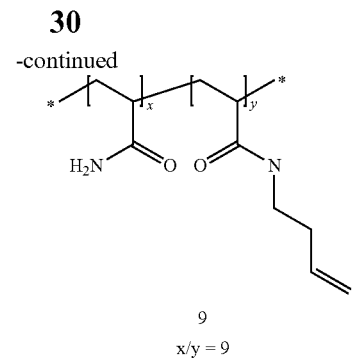

x/y = 9

5.1. Synthesis of the Copolymer 9 (Scheme 2)

Preparation of the monomer (N-(Acryloxy)succinimide) (7)

Acryloyl chloride (3 mL, 36.9 mmol) was added to a stirred solution of N-hydroxysuccinimide (4.25 g, 36.9 mmol) and triethylamine (4.1 g, 5.65 mL, 1.1 equiv) in CHCl$_3$ (30 mL, 1.23M) at 0° C. The solution was allowed to stir for 3 h at 0° C., then washed with brine (2×30 mL), then dried over MgSO$_4$, and recrystallized from a solution of ethyl acetate/hexane (1:1) to give 4.2 g (24.25 mmol) colorless crystals in 67% yield. $^1$H NMR (300 MHz, DMSO) δ/ppm: 6.67 (dd; 1H; =C$\underline{H}$); 6.52 (dd; 1H; =CH$_2$); 6.34 (dd; 1H; =CH$_2$); 2.84 (s; 4H; CH$_2$CH$_2$).

Synthesis of the poly[N-(acryloxy)succinimide] (8)

A mixture of N-(Acryloxy)succinimide (1.3 g, 7.7 mmol) and AIBN (126 mg, 0.1 equiv) in distilled toluene was heated at 80° C. for 15 h. After the solution was cooled to room temperature. The precipitate formed was filtered and washed with diethyl ether. Drying in vacuo afforded poly (N-(Acryloxy)succinimide) (0.8 g, 4.73 mmol) as a white solid (yield: 61%).

$^1$H NMR (300 MHz, DMSO) δ/ppm: 2.80 (s; 4H; C$\underline{H}_2$C$\underline{H}_2$); 3.12 (m; 1H; COCHCH$_2$); 2.06 (m; 2H; COCHC$\underline{H}_2$).

Synthesis of the Copolymer 9

3,4-butene amine (22 μL, 236 μmol) were added to a stirred solution of 400 mg of poly[N-(acryloxy)succinimide] in 4 mL of DMF at room temperature. The reaction was allowed to stir for 2 h at room temperature. Then, 2 mL of NH$_4$OH aqueous solution (30%, d=0.892) was added dropwise to the precedent solution. The solution was allowed to stir for 12 h. Then, the solution was diluted in water (50 mL) dialyzed and lyophilised to obtain the copolyacrylamide (yield: 55%). $^1$H NMR (300 MHz, D$_2$O) δ/ppm: 5.68 (m; 1H; =CH); 5.00 (m; 2H; =C$\underline{H}_2$); 3.12 (m; 2H; CONHC$\underline{H}_2$CH$_2$); 2.48 (m; 2H; CONHCH$_2$C$\underline{H}_2$); 2.11 (m; 12H; COC$\underline{H}$CH$_2$); 1.52 (m; 12H; COCHC$\underline{H}_2$).

Example 6

Synthesis and Characterization of Hydroxyethyl Cellulose Modified by Allyl Bromide Scheme 3

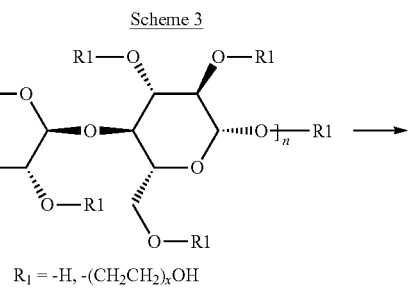

R$_1$ = -H, -(CH$_2$CH$_2$)$_x$OH

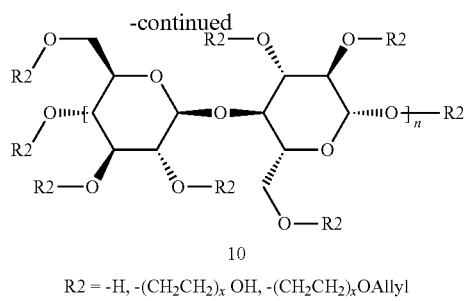

R2 = -H, -(CH2CH2)x OH, -(CH2CH2)xOAllyl 160 mg of sodium hydride ($4.10^{-3}$ mol, 60% dispersion in mineral oil, Aldrich) were added to a stirred solution of hydroxyethyl cellulose (0.3 g, $8.10^{-4}$ mol, Mw=250 000, Aldrich) in 10 mL of DMSO. After, 6.6 μL ($8.10^{-5}$ mol) of allyl bromide were added to the solution (99%, Aldrich). After stirring 15 h at 60° C. a gel was formed. Then, this gel was dried under vacuum, dissolved in water and lyophilised. FTIR-ATR (diamond): $v_{O-H}=3393$ cm$^{-1}$; $v_{CH2,CH3}=3000$-$2800$ cm$^{-1}$; $v_{C=C(allyl)}=1598$ cm$^{-1}$; $\delta_{CH2,CH3}=1424$ cm$^{-1}$.

Example 7

Synthesis and Characterization of Methylcellulose Modified by Allyl Bromide (Copolymer 11)

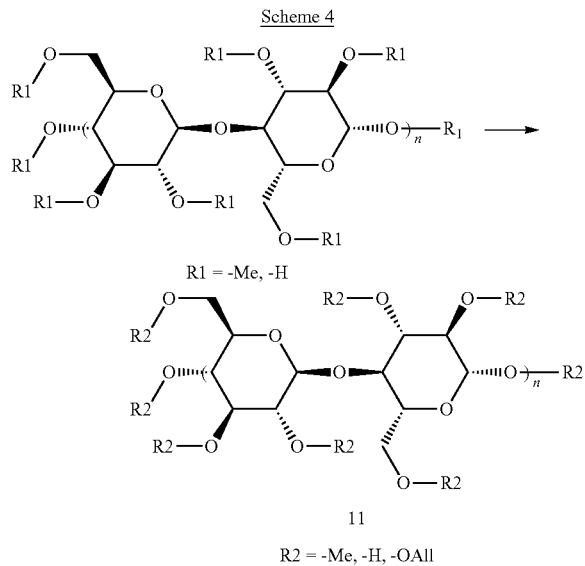

0.3 g of Methyl Cellulose (1.64 mmol, viscosity 8000 cPs (Mn~100000 g/mol), average number of methyl groups attached to ring hydroxyls: 1.5-1.9, Alfa Aesar®) was solubilized in 80 mL of Water at 0° C. during 1 h. Then, 74 mg (1.85 mmol) of sodium hydroxide NaOH were added. After, 1.52 mL (9.25 mmol) of allyl bromide in 2 mL of 1,4-dioxane were added to the solution. After stirring 48 h at 45° C., the final Methyl Cellulose solution was dialysed and lyophilised to give the copolymer 11.

FTIR-ATR: $v_{O-H}=3430$ cm$^{-1}$; $v_{CH-CH2-CH3}=2750$-$3000$ cm$^{-1}$; $v_{C=C}=1658$ cm$^{-1}$; $v_{C-O-C}=1054$ cm$^{-1}$; $\delta_{CH,CH2}=1300$-$1500$ cm$^{-1}$ (Intensity usually affected by degree of crystallinity).

NMR $^1$H (D$_2$O) δ/ppm: 2.9-4.5 (m, O—CH— and O—CH$_2$ and O—CH$_3$ and —CH$_2$—CH=CH$_2$, 227H); 5.10 (m, —CH$_2$—CH=CH$_2$, 2H); 5.80 (m, —CH$_2$—CH=CH$_2$, 1H).

Example 8

Synthesis and Characterization of Dextran Modified by Allyl Bromide (Copolymer 12)

326 mg (8.14 mmol) of sodium hydroxide NaOH were added to a stirred solution of Dextran (0.6 g, 3.7 mmol, Mw=$2 \times 10^6$ g/mol, DEXTRAN from *Leuconostoc mesenteroides*, Sigma-Aldrich) in 20 mL of Water. Then, 152.5 μL (1.85 mmol) of allyl bromide in 1.85 mL of 1,4-dioxane were added to the solution. After stirring 24 h at 60° C., the final Dextran solution was dialysed and lyophilised to give the copolymer 12.

FTIR-ATR: $v_{O-H}=3320$ cm$^{-1}$; $v_{CH-CH2}=2900$ cm$^{-1}$; $v_{C=C}=1636$ cm$^{-1}$; $v_{C-O-C}=1000$ cm$^{-1}$; $\delta_{CH,CH2}=1200$-$1450$ cm$^{-1}$.

NMR $^1$H (D$_2$O) δ/ppm: 3-3.9 (m, O—CH— and O—CH$_2$, 83H); 3.97 (m, —CH$_2$—CH=CH$_2$, 2H); 5.10 (m, —CH$_2$—CH=CH$_2$, 2H); 5.76 (m, —CH$_2$—CH=CH$_2$, 1H).

Example 9

Synthesis of Copolymer 13

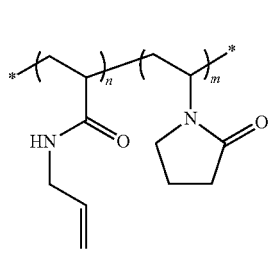

The copolymer 13 was obtained in two steps:

9.1. Copolymerization of N-Vinyl Pyrrolidone (NVP) and N-Acryloxy Succinimide (NAS).

Polymerization experiment was performed in a three-necked round-bottomed flask equipped with a magnetic stirrer and argon inlet. 1 mL of NVP (9.35 mmol) and 176 mg of NAS (1.04 mmol) were dissolved in 21 mL of distilled DMF (Overall concentration of monomers: 0.5 M). The solution was then purged with argon for 2 hours. The temperature was raised to 60° C. using a thermostatted oil bath and finally, 28.6 mg of the initiator (4,4'-Azobis(4-cyanopentanoïc acid)) was added to the reaction mixture. The reaction was allowed to stir under argon atmosphere for 24 hours.

9.2. Nucleophilic Addition of 3,4-Butene Amine on the NAS Moieties.

After 24 hours of stirring, 192 μL (2.08 mmol) of 3,4-butene amine was added to the previous solution. The reaction was allowed to stir for 24 h at 60° C. under argon atmosphere. Then, the solvent was evaporated and the solid obtained was dissolved in water. The aqueous solution was finally dialysed and lyophilized to afford the copolymer 13.

FTIR-ATR: $v_{OH(eau)}=3400$ cm$^{-1}$; $v_{N-H(amide)}=3270$ cm$^{-1}$; $v_{=C-H, NH, CH, CH2,CH3}=3150$-$2800$ cm$^{-1}$; $v_{C=C,C=O(amides)}=1640$ cm$^{-1}$; $\delta_{N-H(amide\ II\ forme\ trans)}=1550$ et $1493$ cm$^{-1}$.

NMR $^1$H (D$_2$O) δ/ppm: 1.15-2 (m, —CH$_2$—CH—CO—NH and —CH$_2$—CH—N—CO and CH$_2$—N—CO—CH$_2$—CH$_2$—, 10H); 2-2.34 (m, —CH$_2$—CH—CO—NH and CO—NH—CH$_2$—CH$_2$ and CH$_2$—N—CO—CH$_2$—, 6H); 3-4 (—CH$_2$—CH—N—CO and —CO—NH—

C$\underline{H}_2$—CH$_2$— and —CH$_2$—C$\underline{H}_2$—N—CO, 8H); 4.91 (m, —CH$_2$—CH=C$\underline{H}_2$, 2H); 5.64 (m, —CH$_2$—C$\underline{H}$=CH$_2$, 1H).

GPC (or SEC). The molecular weights and the molecular weight distributions were measured by size exclusion chromatography (SEC) using Waters Styragel HR 5E columns, a Waters 410 differential refractometer, and a Waters 486 UV detector. With the used columns, the molecular weight range claimed to separate is $2\times10^3$ to $4\times10^6$ of PS equivalent. The light wavelength of the differential refractometer is 930 nm. THF was used as the eluent at 1 mL/min. For copolymer 13: Mw=12200 g/mol, polydispersity: 1.27.

Example 10

Grafting of Different Copolymers on the Silicone Substrate (SYLGARD®184 and NUSIL® MED 4750) to Confer Hydrophilic Properties 10.1. Preparation of the Silicone Materials (SYLGARD®184).

SYLGARD®184 silicone elastomer, base and curing agent, is supplied as two-part kit comprised of liquid components. The base and the curing agent are usually mixed in a 10:1 weight ratio. The mixture is agitated vigorously for about 5 to 10 minutes. Air-entrapped in the mixture is removed under weak vacuum; this may take 30 to 60 minutes depending on the amount of air introduced during mixing. Then, the mixture is cured at 70° C. for 24 hours.

10.2. Chemical Grafting of Copolymers 9, 10, 11, 12 and 13 onto Silicone Materials Same procedure is used and same remarks are valuable as those described in section 2.2.

10.3. Results

Silicone surfaces grafted with copolymers 9, 10, 11, 12 and 13 exhibit clearly hydrophilic surface properties compared to untreated silicones (see Table 4).

TABLE 4

Water dynamic contact angles (AA: Advancing Angle; AR: Receding Angle) of different grafted PDMS surfaces (NUSIL ® MED 4750 and SYLGARD ® 184).

| Entry | Reactions condition | Water dynamic contact angles | | |
|---|---|---|---|---|
| | | AA (°) | RA (°) | Hyst (°) |
| 1 | NUSIL ® MED 4750 (1/1, NC) + 12 | 58.7 | 21.1 | 37.6 |
| 2 | NUSIL ® MED 4750 (1/1, NC) + 11 | 86.8 | 27.0 | 59.9 |
| 3 | NUSIL ® MED 4750 (1/1, NC) + 10 | 93.3 | 48 | 45.3 |
| 4 | NUSIL ® MED 4750 (1/1, NC) + 13 | 81.8 | 45.6 | 36.2 |
| 5 | NUSIL ® MED 4750 (1/1, NC) + 9 | 104.2 | 38.9 | 65.3 |
| 6 | NUSIL ® MED 4750 | 96.6 | 89.9 | 6.7 |

Example 11

Grafting of the Copolymer 3 on Hydrogen-Terminated Silicon Surfaces 11.1. Preparation of the Silicon Wafers Si wafers (100 orientation, P doped, resistivity 1-20 Ωcm, thickness 280 μm) from ACM (Villiers St Frederic, France) were incubated before treatment with a 10% HF solution to generate Si—H bonds on surface during 30 minutes.

11.2. Chemical Grafting of Copolymer 3 onto Silicon Wafers

Si wafers were immersed in isopropanol containing 2 mg/mL of copolymer 3 with one drop of a H$_2$PtCl$_6$ solution (8 wt. % in isopropanol) and incubated at 70° C. overnight.

11.3. Determination of Surface Charge Densities

Same procedure is used than in section 2.2.

11.4. Results

Silicon wafers grafted with copolymer 3 exhibits clearly a high cationic charge density (see Table 5).

TABLE 5

Charged density of grafted silicon surface.

| Entry | Reactions condition[a] | Density of cationic charge (charge/cm$^2$)[b] |
|---|---|---|
| 1 | Si wafer + 3 + Pt[c] | $5 \times 10^{14}$ |

[a]Si wafers were incubated before treatment with a 10% HF solution to generate Si—H bonds on surface.
[b]Density of cationic charge was determined by fluorescein titration.
[c]Si wafer was immersed in isopropanol containing 2 mg/mL of 3 with Pt catalyst.

Example 12

Assessment of Bacteria Attachment on Silicone Surfaces

Epifluorescence Microscopy

Silicone samples of 1×1×0.1 cm$^3$ were immersed in 4 mL of *E. coli* (MG 1655) suspensions in LB growth medium. After 48 hours of incubation at 37° C., the samples are washed in two baths of sterile water (2×10 min). Then, the bacteria attached on the surfaces are labelled with Syto 9® and observed using the Epifluorescence Microscope (water immersion objective ×40). To perform the bacteria enumeration, 15 images of different zones of the sample surfaces are recorded. The results are given in Table 6.

Classical Test

Silicone samples of 1×1×0.1 cm$^3$ were immersed in 4 mL of *E. coli* (MG 1655) suspensions in LB growth medium. After 48 hours of incubation at 37° C., the samples are washed in two baths of sterile water (2×10 min). Then, adherent bacteria were recovered by immersion of the samples in 1 mL of sterile distilled water for 1 h followed by vortex agitation during 2 min.

Bacterial enumeration was performed by plating out decimal dilutions of the suspension on LB-Agar. After incubation for 24 at 37° C., the number of bacteria was expressed as CFU per cm$^2$ of the silicone surfaces (Table 6).

TABLE 6

*E. coli* (MG1655) densities on silicone surfaces

| Sample | Bacteria density determined by microscopy | Bacteria density determined by classical test |
|---|---|---|
| NUSIL ® MED 4750 | $5.00 \times 10^6$ | $1.12 \times 10^6$ |
| NUSIL ® MED 4750 (1/1, NC) + 11 | $4.17 \times 10^3$ | $6.61 \times 10^3$ |
| NUSIL ® MED 4750 (1/1, C) + 11 | $3.48 \times 10^3$ | / |
| NUSIL ® MED 4750 (1/1, NC) + 9 | $1.84 \times 10^5$ | / |
| NUSIL ® MED 4750 (1/1, NC) + 12 | $2.58 \times 10^4$ | / |
| NUSIL ® MED 4750 (1/1, NC) + 10 | $1.56 \times 10^4$ | / |
| NUSIL ® MED 4750 (1/1, NC) + 13 | $3.33 \times 10^3$ | / |

The invention claimed is:

1. A method for treating a substrate or a surface thereof bearing Si—H groups to confer to the substrate or the surface thereof a physical and/or biochemical surface-modified property, wherein the method comprises at least a step consisting of exposing, within a liquid medium, the substrate or a surface thereof with at least a statistical copolymer to create covalent bonding of the copolymer to the substrate or the surface, the copolymer comprising:

at least three reactive sites able to attach to the substrate or the surface by reacting with Si—H groups and thereby creating covalent bonds, and at least a molecule or a part thereof able to confer the modified property to the substrate or the surface thereof, the copolymer comprising at least a monomer unit of type A comprising at least one of the reactive sites and at least a monomer unit of type B comprising at least one of the molecule or part thereof able to confer the modified property, the step being carried out in conditions to promote a covalent grafting of the copolymer to the substrate or surface thereof and a weight average molecular weight of the copolymer being greater than 3,000 g/mol and less than 8,000,000 g/mol, and the reactive site able to attach to the substrate or the surface thereof is an alkene group.

2. The method according to claim 1, wherein the weight average molecular weight of the copolymer is greater than 5,000 g/mol.

3. The method according to claim 1, wherein the copolymer comprises at least three monomer units comprising an alkene group.

4. The method according to claim 1, wherein the modified property is selected from the group consisting of: hydrophilic character; improved hydrophobic character, cytotoxic properties; cell-adhesion property; improved biocompatibility; electric conductivity property and reactivity property which renders the surface able to immobilize biomolecules.

5. The method according to claim 4, wherein the modified property is hydrophilic character.

6. The method according to claim 4, wherein the modified property is cytotoxic properties.

7. The method according to claim 4, wherein the modified property is reactivity property.

8. The method according to claim 1, wherein the physical and/or biochemical surface-modified property is imparted by a presence within the copolymer of a property-modifier group which is selected from the group consisting of monosaccharides, zwitterionic moieties or polymer chains of water-soluble polymers having a weight average molecular weight of less than 5,000 g/mol; polyethylene oxide; polyethylene glycol; amino-terminated polyethylene glycol; polypropylene glycol; polypropylene oxide; polypropylene glycol bis(2-amino-propyl ether); polyalcohols; polysaccharides; poly(vinyl pyridine); polyacids; polyacrylamides, fluorinated groups, (C1-C10)alkyl groups, polysarcosine, polyvinylpyrrolidone, polyaniline, polypyrrole, polythiophene, aminopenicillanic acid, quaternary ammonium groups, quaternary phosphonium groups, guanidinium groups, imidazolium groups and sulfunium groups.

9. The method according to claim 1, wherein the exposing step is followed by a curing step.

10. The method according to claim 1, wherein the liquid medium is an aqueous medium.

11. The method according to claim 1, wherein the substrate or surface thereof bearing Si—H groups is a silicone substrate or a hydrogen-terminated silicon substrate.

12. A method for treating a substrate or a surface thereof bearing Si—H groups to confer to the substrate or the surface thereof a physical and/or biochemical surface-modified property according to claim 1, wherein the copolymer comprises:

a polymeric chain backbone selected from the group consisting of polyethylene, polyacrylamide, polyacrylate, polyvinyl derivatives, polystyrene wherein a phenyl group of the polystyrene is optionally substituted with a (C1-C4)alkyl, polyalcohol, polyvinylbenzyl, polyamine, polymethacrylate, polymethacrylamide, polyether, polyester, polyamide, polyurethane, poly (ethylene-alt-succinimide), polysaccharide derivatives, polyureas, and poly(diallyldimethylammonium) inherently comprising a quaternary ammonium group.

13. The method according to claim 12, wherein the polymeric chain backbone is methylcellulose.

14. A substrate bearing Si—H groups that has been provided on a surface of the substrate with a modified physical and/or biochemical property, obtainable by the method according to claim 1.

15. A medical device comprising the substrate according to claim 14, wherein the substrate is a silicone substrate.

16. The substrate according to claim 14, wherein the substrate is an optical article.

17. The substrate according to claim 14, wherein the substrate is a biomedical implant.

18. The substrate according to claim 14, wherein the substrate is a biosensor.

19. The substrate according to claim 14, wherein the substrate is a biomedical material selected from the group consisting of a stent, a shunt, a catheter and a lens.

20. The substrate according to claim 14, wherein the modified physical and/or biochemical property is selected from the group consisting of hydrophilic character, cytotoxic properties, reactivity property or improved biocompatibility.

21. The substrate according to claim 14, wherein the modified physical and/or biochemical property is an antibiotic property.

22. The substrate according to claim 14, wherein the modified physical and/or biochemical property is an antibiotic property, the monomer of type B comprises quaternary ammonium, and a density of active antibiotic sites per unit surface area ranges from $10^{14}$ to $10^{16}$ per $cm^2$.

* * * * *